US011398952B2

(12) United States Patent
Petria et al.

(10) Patent No.: US 11,398,952 B2
(45) Date of Patent: Jul. 26, 2022

(54) AUTOMATED CONFIGURATION OF MACHINE-TO-MACHINE SYSTEMS

(71) Applicant: Intel Corporation, Santa Clara, CA (US)

(72) Inventors: Silviu Petria, Stilpeni (RO); Andra Paraschiv, Braila (RO); George Cristian Dumitru Milescu, Bucharest (RO); Ulf Christian Bjorkengren, Bjarred (SE); Shao-Wen Yang, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 17/306,304

(22) Filed: May 3, 2021

(65) Prior Publication Data
US 2022/0021583 A1  Jan. 20, 2022

Related U.S. Application Data

(63) Continuation of application No. 16/306,559, filed as application No. PCT/US2016/040644 on Jul. 1, 2016, now Pat. No. 10,999,144.

(51) Int. Cl.
*H04L 41/08* (2022.01)
*H04W 4/38* (2018.01)
(Continued)

(52) U.S. Cl.
CPC .......... *H04L 41/0886* (2013.01); *H04L 12/66* (2013.01); *H04L 67/34* (2013.01);
(Continued)

(58) Field of Classification Search
CPC ......... H04W 4/70; H04W 4/50; H04W 8/005; H04W 4/38; H04L 67/12; H04L 67/34;
(Continued)

(56) References Cited

U.S. PATENT DOCUMENTS 9,462,041 B1 * 10/2016 Hagins ................ H04L 12/2834
9,531,559 B1 * 12/2016 Vlaminck ............... H04L 67/10
(Continued)

FOREIGN PATENT DOCUMENTS

CN     102687547 A    9/2012
WO    2014182706 A1   11/2014
WO    2017111828 A1   6/2017

OTHER PUBLICATIONS

EPO; Extended European Search Report issued in EP Patent Application No. 16907593.4; dated Nov. 13, 2019; 11 pages.
(Continued)

*Primary Examiner* — Shean Tokuta
(74) *Attorney, Agent, or Firm* — Alliance IP, LLC

(57) ABSTRACT

A gateway is provided with configuration management logic to identify a set of configurations corresponding to a deployment of a particular application, and automatically send corresponding configuration data to a set of devices in range of the gateway. Service management logic of the gateway determines that assets on the set of devices correspond to one or more asset abstractions defined for the particular application, where the configuration data is sent to the set of devices based on the assets corresponding to the asset abstractions. Sensor data is received during the deployment as generated by a sensor asset of one of the devices, the sensor data is processed according to service logic of the particular application to generate a result, and actuating data is generated and sent during the deployment to an actuator asset on the set of devices based on the result.

1 Claim, 12 Drawing Sheets

(51) Int. Cl.
  *H04W 4/70* (2018.01)
  *H04L 12/66* (2006.01)
  *H04L 67/00* (2022.01)
  *H04W 4/50* (2018.01)
(52) U.S. Cl.
  CPC .............. *H04W 4/38* (2018.02); *H04W 4/50* (2018.02); *H04W 4/70* (2018.02)
(58) Field of Classification Search
  CPC . H04L 12/66; H04L 41/0806; H04L 41/0853; H04L 41/0866; H04L 41/0886; H04L 41/089
  See application file for complete search history.

(56) References Cited

U.S. PATENT DOCUMENTS

| | | | |
|---|---|---|---|
| 10,423,459 B1* | 9/2019 | Jacques de Kadt | G06F 9/5061 |
| 2009/0036750 A1* | 2/2009 | Weinstein | G16H 40/67 600/300 |
| 2012/0003933 A1* | 1/2012 | Baker | G16H 40/67 455/41.2 |
| 2012/0047551 A1 | 2/2012 | Pattar et al. | |
| 2014/0122878 A1 | 5/2014 | Cho et al. | |
| 2014/0351099 A1 | 11/2014 | Zhu | |
| 2015/0223186 A1 | 8/2015 | Pierrel et al. | |
| 2015/0334591 A1 | 11/2015 | Keshavdas et al. | |
| 2016/0142868 A1* | 5/2016 | Kulkarni | G01S 5/0252 455/456.5 |
| 2016/0165651 A1* | 6/2016 | Pathuri | H04W 8/26 370/329 |
| 2016/0198323 A1* | 7/2016 | Sakamoto | H04W 4/20 455/557 |
| 2016/0226732 A1* | 8/2016 | Kim | H04W 12/0431 |
| 2016/0275336 A1* | 9/2016 | Park | G06V 40/20 |
| 2017/0261949 A1* | 9/2017 | Hoffmann | G05B 13/0265 |
| 2017/0331860 A1* | 11/2017 | Ofversten | H04W 4/38 |
| 2018/0189667 A1* | 7/2018 | Tsou | G06N 5/003 |
| 2018/0198755 A1* | 7/2018 | Domangue | H04W 4/021 |
| 2018/0367616 A1* | 12/2018 | Yang | H04L 67/12 |
| 2018/0375720 A1* | 12/2018 | Yang | H04L 41/084 |
| 2019/0104397 A1* | 4/2019 | Khan | H04L 67/18 |
| 2019/0138318 A1* | 5/2019 | Yang | H04W 4/70 |
| 2019/0154872 A1* | 5/2019 | Leduc | G06N 3/08 |
| 2019/0238662 A1* | 8/2019 | Guibene | H04L 29/06 |
| 2019/0296967 A1* | 9/2019 | Yang | H04L 41/0893 |
| 2019/0306024 A1* | 10/2019 | Petria | H04W 4/70 |

OTHER PUBLICATIONS

EPO; Office Action issued for EP Patent Application No. 16907593.4, dated Dec. 9, 2020; 5 pages.
EPO; Office Action issued in EP Patent Application No. 16907593.4, dated Sep. 2, 2021; 4 pages.
ETSI; "Machine-to-Machine Communications (M2M); M2M service requirements," draft ETSI TS 102 689 V0.2.1; dated Nov. 3, 2009; 45 pages.
HGI; "Smart Home Architecture and System Requirements," dated Dec. 2015; retrieved from the internet at www.homegatewayinitiative.org/userfiles/file/downloads/RD036Publication.pdf; 32 pages.
International Preliminary Report on Patentability for PCT Application No. PCT/US2016/040644, dated Jan. 1, 2019, 8 pages.
International Search Report dated Mar. 29, 2017 for PCT/US2016/040644, 3 pages.
Li, Weihua, et al.; "Update of draft Recommendation ITU-T Y.gw-IoT-reqts, "Common requirements and capabilities of gateway for IoT applications": output from the Q2IL3 Sep. 16-20, 2013 e-meeting," International Telecommunication Union, Telecommunication Standardization Sector; dated Sep. 2013; 27 pages.
SIPO; First Office Action issued in CN Patent Application No. 201680086360.5, dated Oct. 26, 2020; 5 pages without English translation.
Written Opinion of the International Searching Authority dated Mar. 29, 2017 for PCT/US2016/040644, 6 pages.
Young, Joo Jae, et al., "A Design of Integrated Gateway for Variety IoT Devices Management", Proceedings of Symposium of the Korean Institute of Communications and Information Sciences, Nov. 30, 2015, pp. 234-235.

* cited by examiner

AUTOMATED CONFIGURATION OF MACHINE-TO-MACHINE SYSTEMS

CROSS-REFERENCE TO RELATED APPLICATIONS

This application is a continuation of U.S. application Ser. No. 16/306,559, filed on Dec. 1, 2018, and entitled AUTOMATED CONFIGURATION OF MACHINE-TO-MACHINE SYSTEMS, which is a national stage application under 35 U.S.C. § 371 of PCT International Application Serial No. PCT/US2016/040644, filed on Jul. 1, 2016, and entitled AUTOMATED CONFIGURATION OF MACHINE-TO-MACHINE SYSTEMS. The disclosures of the prior applications are considered part of and are hereby incorporated by reference in their entireties in the disclosure of this application.

TECHNICAL FIELD

This disclosure relates in general to the field of computer systems and, more particularly, to managing machine-to-machine systems.

BACKGROUND

The Internet has enabled interconnection of different computer networks all over the world. While previously, Internet-connectivity was limited to conventional general purpose computing systems, ever increasing numbers and types of products are being redesigned to accommodate connectivity with other devices over computer networks, including the Internet. For example, smart phones, tablet computers, wearables, and other mobile computing devices have become very popular, even supplanting larger, more traditional general purpose computing devices, such as traditional desktop computers in recent years. Increasingly, tasks traditionally performed on a general purpose computers are performed using mobile computing devices with smaller form factors and more constrained features sets and operating systems. Further, traditional appliances and devices are becoming "smarter" as they are ubiquitous and equipped with functionality to connect to or consume content from the Internet. For instance, devices, such as televisions, gaming systems, household appliances, thermostats, automobiles, watches, have been outfitted with network adapters to allow the devices to connect with the Internet (or another device) either directly or through a connection with another computer connected to the network. Additionally, this increasing universe of interconnected devices has also facilitated an increase in computer-controlled sensors that are likewise interconnected and collecting new and large sets of data. The interconnection of an increasingly large number of devices, or "things," is believed to foreshadow a new era of advanced automation and interconnectivity, referred to, sometimes, as the Internet of Things (IoT).

BRIEF DESCRIPTION OF THE DRAWINGS

Like reference numbers and designations in the various drawings indicate like elements.

DETAILED DESCRIPTION OF EXAMPLE EMBODIMENTS

Figure 1A:
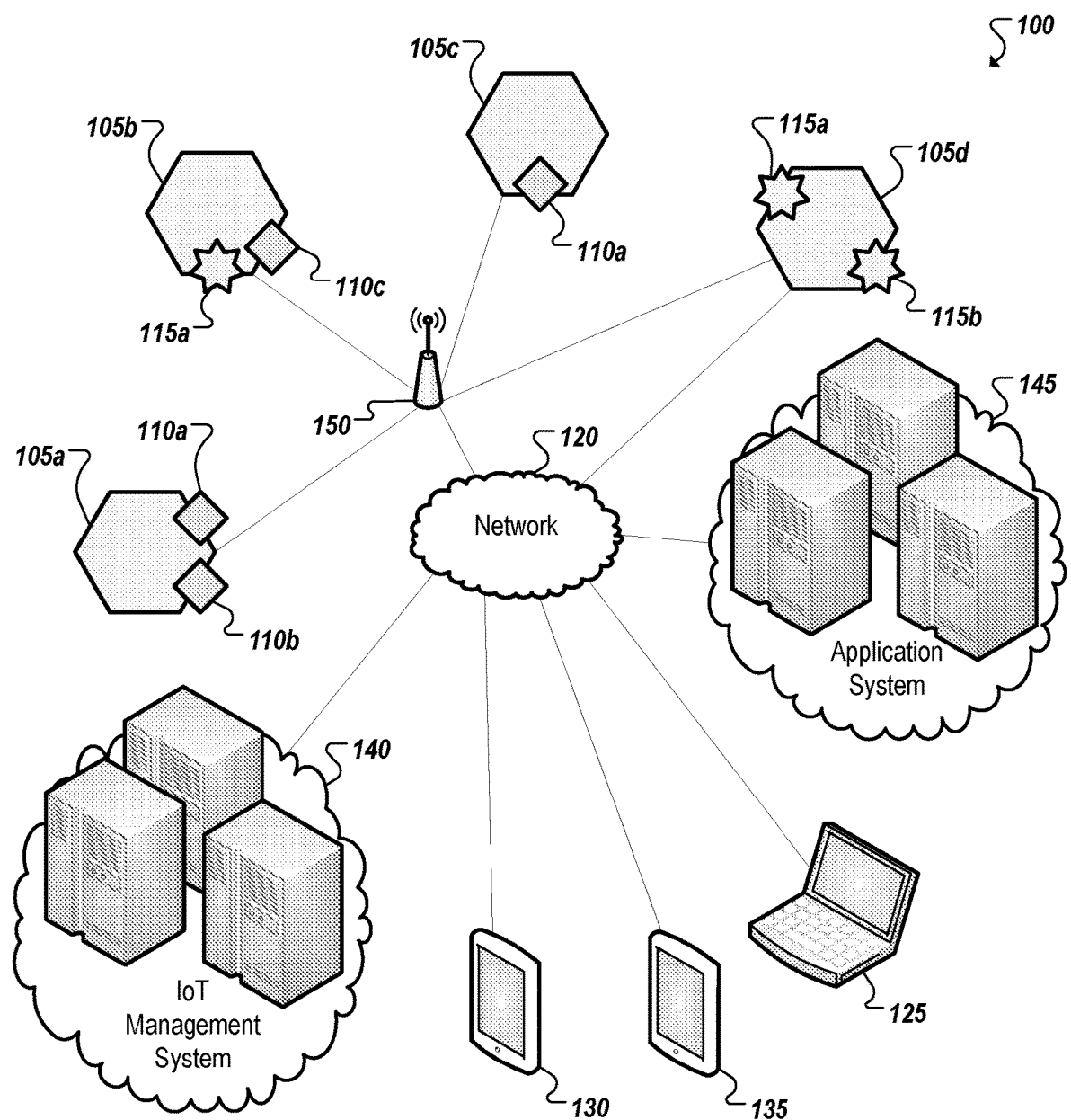
FIG. 1A illustrates an embodiment of a system including multiple sensor devices and an example management system.

FIG. 1A is a block diagram illustrating a simplified representation of a system 100 that includes one or more devices 105a-d, or assets, deployed throughout an environment. Each device 105a-d may include a computer processor and/or communications module to allow each device 105a-d to interoperate with one or more other devices (e.g., 105a-d) or systems in the environment. Each device can further include one or more instances of various types of sensors (e.g., 110a-c), actuators (e.g., 115a-b), storage, power, computer processing, and communication functionality which can be leveraged and utilized (e.g., by other devices or software) within a machine-to-machine, or Internet of Things (IoT) system or application. Sensors are capable of detecting, measuring, and generating sensor data describing characteristics of the environment in which they reside, are mounted, or are in contact with. For instance, a given sensor (e.g., 110a-c) may be configured to detect one or more respective characteristics such as movement, weight, physical contact, temperature, wind, noise, light, computer communications, wireless signals, position, humidity, the presence of radiation, liquid, or specific chemical compounds, among several other examples. Indeed, sensors (e.g., 110a-c) as described herein, anticipate the development of a potentially limitless universe of various sensors, each designed to and capable of detecting, and generating corresponding sensor data for, new and known environmental characteristics. Actuators (e.g., 115a-b) can allow the device to perform (or even emulate) some kind of action or otherwise cause an effect to its environment (e.g., cause a state or characteristics of the environment to be maintained or changed). For instance, one or more of the devices (e.g., 105b, d) may include one or more respective actuators that accepts an input and perform its respective action in response. Actuators can include controllers to activate additional functionality, such as an actuator to selectively toggle the power or operation of an alarm, camera (or other sensors), heating, ventilation, and air conditioning (HVAC) appliance, household appliance, invehicle device, lighting, among other examples. Actuators may also be provided that are configured to perform passive functions.

In some implementations, sensors 110a-c and actuators 115a-b provided on devices 105a-d can be assets incorporated in and/or forming an Internet of Things (IoT) or machine-to-machine (M2M) system. IoT systems can refer to new or improved ad-hoc systems and networks composed of multiple different devices interoperating and synergizing to deliver one or more results or deliverables. Such ad-hoc systems are emerging as more and more products and equipment evolve to become "smart" in that they are controlled or monitored by computing processors and provided with facilities to communicate, through computer-implemented mechanisms, with other computing devices (and products having network communication capabilities). For instance, IoT systems can include networks built from sensors and communication modules integrated in or attached to "things" such as equipment, toys, tools, vehicles, etc. and even living things (e.g., plants, animals, humans, etc.). In some instances, an IoT system can develop organically or unexpectedly, with a collection of sensors monitoring a variety of things and related environments and interconnecting with data analytics systems and/or systems controlling one or more other smart devices to enable various use cases and application, including previously unknown use cases. Further, IoT systems can be formed from devices that hitherto had no contact with each other, with the system being composed and automatically configured spontaneously or on the fly (e.g., in accordance with an IoT application defining or controlling the interactions). Further, IoT systems can often be composed of a complex and diverse collection of connected devices (e.g., 105a-d), such as devices sourced or controlled by varied groups of entities and employing varied hardware, operating systems, software applications, and technologies.

Facilitating the successful interoperability of such diverse systems is, among other example considerations, an important issue when building or defining an IoT system. Software applications can be developed to govern how a collection of IoT devices can interact to achieve a particular goal or service. In some cases, the IoT devices may not have been originally built or intended to participate in such a service or in cooperation with one or more other types of IoT devices. Indeed, part of the promise of the Internet of Things is that innovators in many fields will dream up new applications involving diverse groupings of the IoT devices as such devices become more commonplace and new "smart" or "connected" devices emerge. However, the act of programming, or coding, such IoT applications may be unfamiliar to many of these potential innovators, thereby limiting the ability of these new applications to be developed and come to market, among other examples and issues.

As shown in the example of FIG. 1A, multiple IoT devices (e.g., 105a-d) can be provided from which one or more different IoT applications can be built. For instance, a device (e.g., 105a-d) can include such examples as a mobile personal computing device, such as a smart phone or tablet device, a wearable computing device (e.g., a smart watch, smart garment, smart glasses, smart helmet, headset, etc.), purpose-built devices such as and less conventional computer-enhanced products such as home, building, vehicle automation devices (e.g., smart heat-ventilation-air-conditioning (HVAC) controllers and sensors, light detection and controls, energy management tools, etc.), smart appliances (e.g., smart televisions, smart refrigerators, etc.), and other examples. Some devices can be purpose-built to host sensor and/or actuator resources, such as a weather sensor devices that include multiple sensors related to weather monitoring (e.g., temperature, wind, humidity sensors, etc.), traffic sensors and controllers, among many other examples. Some devices may be statically located, such as a device mounted within a building, on a lamppost, sign, water tower, secured to a floor (e.g., indoor or outdoor), or other fixed or static structure. Other devices may be mobile, such as a sensor provisioned in the interior or exterior of a vehicle, in-package sensors (e.g., for tracking cargo), wearable devices worn by active human or animal users, an aerial, ground-based, or underwater drone among other examples. Indeed, it may be desired that some sensors move within an environment and applications can be built around use cases involving a moving subject or changing environment using such devices, including use cases involving both moving and static devices, among other examples.

Continuing with the example of FIG. 1A, software-based IoT management platforms can be provided to allow developers and end users to build and configure IoT applications and systems. An IoT application can provide software support to organize and manage the operation of a set of IoT device for a particular purpose or use case. In some cases, an IoT application can be embodied as an application on an operating system of a user computing device (e.g., 120) or a mobile app for execution on a smart phone, tablet, smart watch, or other mobile device (e.g., 125, 130). In some cases, the application can have an application-specific management utility allowing users to configure settings and policies to govern how the set devices (e.g., 105a-d) are to operate within the context of the application. A management utility can also be used to select which devices are used with the application. In other cases, a dedicated IoT management application can be provided which can manage potentially multiple different IoT applications or systems. The IoT management application, or system, may be hosted on a single system, such as a single server system (e.g., 140) or a single end-user device (e.g., 125, 130, 135). Alternatively, an IoT management system can be distributed across multiple hosting devices (e.g., 125, 130, 135, 140, etc.).

In still other examples, IoT applications may be localized, such that a service is implemented utilizing an IoT system (e.g., of devices 105a-d) within a specific geographic area, room, or location. In some instances, IoT devices (e.g., 105a-d) may connect to one or more gateway devices (e.g., 150) on which a portion of management functionality (e.g., as shared with or supported by management system 140) and a portion of application service functionality (e.g., as shared with or supported by application system 145). Service logic and configuration data may be pushed (or pulled) from the gateway device 150 to other devices within range or proximity of the gateway device 150 to allow the set of devices (e.g., 105a-s and 150) to implement a particular service within that location. A gateway device (e.g., 150) may be implemented as a dedicated gateway element, or may be a multi-purpose or general purpose device, such as another IoT device (similar to devices 105a-d) that itself may include sensors and/or actuators to perform tasks within an IoT system, among other examples.

In some cases, applications can be programmed, or otherwise built or configured, utilizing interfaces of an IoT management system. In some cases, the interfaces can adopt asset abstraction to simplify the IoT application building process. For instance, users can simply select classes, or taxonomies, of devices and logically assemble a collection of select devices classes to build at least a portion of an IoT application (e.g., without having to provide details regarding configuration, device identification, data transfer, etc.). Further, IoT application systems built using the IoT management system can be sharable, in that a user can send data identifying the built system to another user, allowing the other user to simply port the abstracted system definition to the other user's environment (even when the combination of device models is different from that of the original user's system). Additionally, system or application settings, defined by a given user, can be configured to be sharable with other users or portable between different environments, among other example features.

In some cases, IoT systems can interface (through a corresponding IoT management system or application or one or more of the participating IoT devices) with remote services, such as data storage, information services (e.g., media services, weather services), geolocation services, and computational services (e.g., data analytics, search, diagnostics, etc.) hosted in cloud-based and other remote systems (e.g., 140, 145). For instance, the IoT system can connect to a remote service (e.g., 145) over one or more networks 120. In some cases, the remote service can, itself, be considered an asset of an IoT application. Data received by a remotely-hosted service can be consumed by the governing IoT application and/or one or more of the component IoT devices to cause one or more results or actions to be performed, among other examples.

One or more networks (e.g., 120) can facilitate communication between sensor devices (e.g., 105*a-d*), end user devices (e.g., 123, 130, 135), and other systems (e.g., 140, 145) utilized to implement and manage IoT applications in an environment. Such networks can include wired and/or wireless local networks, public networks, wide area networks, broadband cellular networks, the Internet, and the like.

In general, "servers," "clients," "computing devices," "network elements," "hosts," "system-type system entities," "user devices," "gateways," "IoT devices," "sensor devices," and "systems" (e.g., 105*a-d*, 125, 130, 135, 140, 145, 150, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing apparatus. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

While FIG. 1A is described as containing or being associated with a plurality of elements, not all elements illustrated within computing environment 100 of FIG. 1A may be utilized in each alternative implementation of the present disclosure. Additionally, one or more of the elements described in connection with the examples of FIG. 1A may be located external to computing environment 100, while in other instances, certain elements may be included within or as a portion of one or more of the other described elements, as well as other elements not described in the illustrated implementation. Further, certain elements illustrated in FIG. 1A may be combined with other components, as well as used for alternative or additional purposes in addition to those purposes described herein.

As noted above, a collection of devices, or endpoints, may participate in Internet-of-things (IoT) networking, which may utilize wireless local area networks (WLAN), such as those standardized under IEEE 802.11 family of standards, home-area networks such as those standardized under the Zigbee Alliance, personal-area networks such as those standardized by the Bluetooth Special Interest Group, cellular data networks, such as those standardized by the Third-Generation Partnership Project (3GPP), and other types of networks, having wireless, or wired, connectivity. For example, an endpoint device may also achieve connectivity to a secure domain through a bus interface, such as a universal serial bus (USB)-type connection, a High-Definition Multimedia Interface (HDMI), or the like.

Figure 1B:
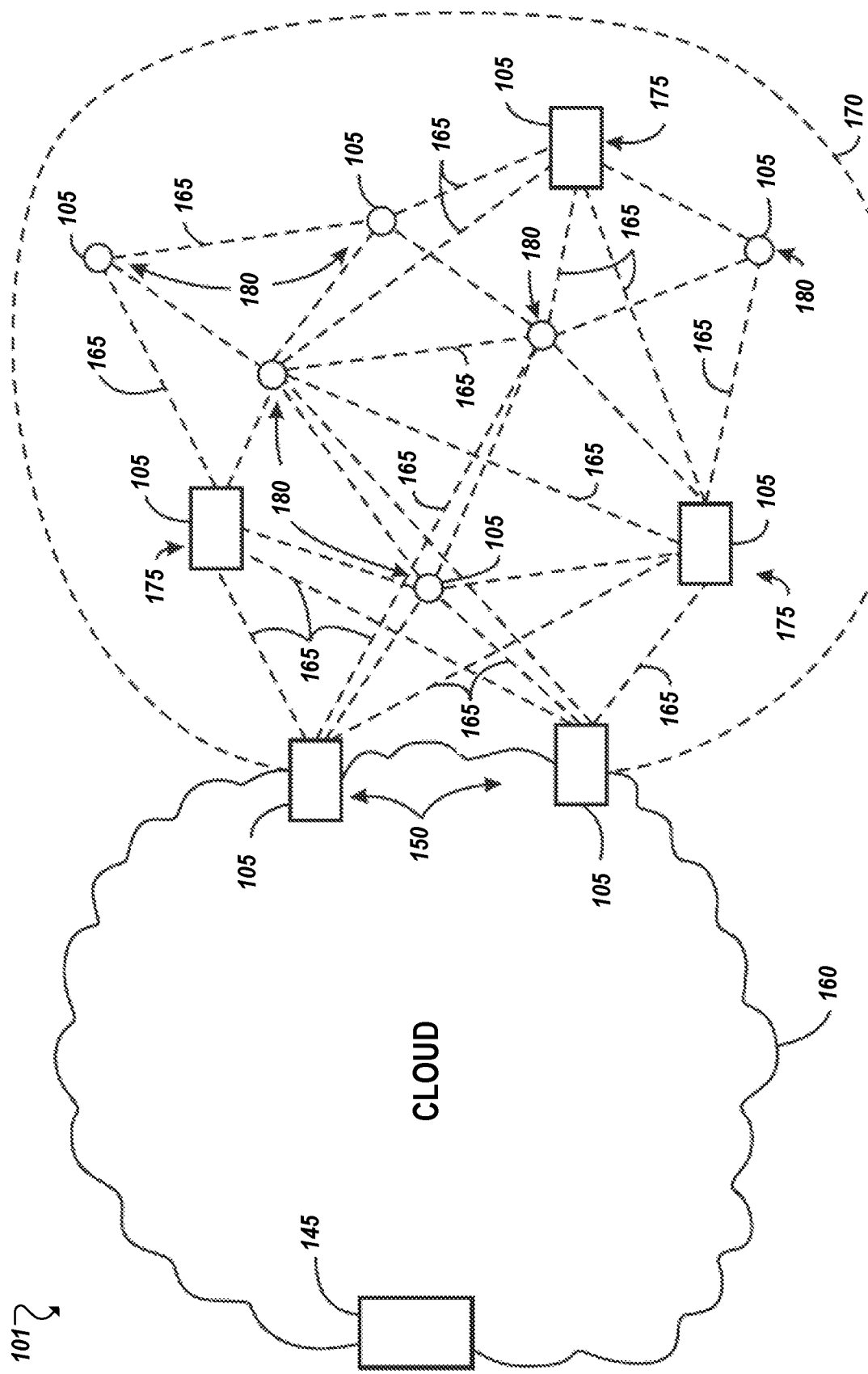
FIG. 1B illustrates an embodiment of a cloud computing network.

As shown in the simplified block diagram 101 of FIG. 1B, in some instances, a cloud computing network, or cloud, in communication with a mesh network of IoT devices (e.g., 105*a-d*), which may be termed a "fog," may be operating at the edge of the cloud. To simplify the diagram, not every IoT device 105 is labeled.

The fog 170 may be considered to be a massively interconnected network wherein a number of IoT devices 105 are in communications with each other, for example, by radio links 165. This may be performed using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the optimized link state routing (OLSR) Protocol, or the better approach to mobile ad-hoc networking (B.A.T-.M.A.N.), among others.

Three types of IoT devices 105 are shown in this example, gateways 150, data aggregators 175, and sensors 180, although any combinations of IoT devices 105 and functionality may be used. The gateways 150 may be edge devices that provide communications between the cloud 160 and the fog 170, and may also function as charging and locating devices for the sensors 180. The data aggregators 175 may provide charging for sensors 180 and may also locate the sensors 180. The locations, charging alerts, battery alerts, and other data, or both may be passed along to the cloud 160 through the gateways 150. As described herein, the sensors 180 may provide power, location services, or both to other devices or items.

Communications from any IoT device 105 may be passed along the most convenient path between any of the IoT devices 105 to reach the gateways 150. In these networks, the number of interconnections provide substantial redundancy, allowing communications to be maintained, even with the loss of a number of IoT devices 105.

The fog 170 of these IoT devices 105 devices may be presented to devices in the cloud 160, such as a server 145, as a single device located at the edge of the cloud 160, e.g., a fog 170 device. In this example, the alerts coming from the fog 170 device may be sent without being identified as coming from a specific IoT device 105 within the fog 170. For example, an alert may indicate that a sensor 180 needs to be returned for charging and the location of the sensor 180, without identifying any specific data aggregator 175 that sent the alert.

In some examples, the IoT devices 105 may be configured using an imperative programming style, e.g., with each IoT device 105 having a specific function. However, the IoT devices 105 forming the fog 170 may be configured in a declarative programming style, allowing the IoT devices 105 to reconfigure their operations and determine needed resources in response to conditions, queries, and device failures. Corresponding service logic may be provided to dictate how devices may be configured to generate ad hoc assemblies of devices, including assemblies of devices which function logically as a single device, among other examples. For example, a query from a user located at a server 145 about the location of a sensor 180 may result in the fog 170 device selecting the IoT devices 105, such as particular data aggregators 175, needed to answer the query. If the sensors 180 are providing power to a device, sensors associated with the sensor 180, such as power demand, temperature, and the like, may be used in concert with sensors on the device, or other devices, to answer a query. In this example, IoT devices 105 in the fog 170 may select the sensors on particular sensor 180 based on the query, such as adding data from power sensors or temperature sensors. Further, if some of the IoT devices 105 are not operational, for example, if a data aggregator 175 has failed, other IoT devices 105 in the fog 170 device may provide substitute, allowing locations to be determined.

Further, the fog 170 may divide itself into smaller units based on the relative physical locations of the sensors 180 and data aggregators 175. In this example, the communications for a sensor 180 that has been instantiated in one portion of the fog 170 may be passed along to IoT devices 105 along the path of movement of the sensor 180. Further, if the sensor 180 is moved from one location to another location that is in a different region of the fog 170, different data aggregators 175 may be identified as charging stations for the sensor 180.

As an example, if a sensor 180 is used to power a portable device in a chemical plant, such as a personal hydrocarbon detector, the device will be moved from an initial location, such as a stockroom or control room, to locations in the chemical plant, which may be a few hundred feet to several thousands of feet from the initial location. If the entire facility is included in a single fog 170 charging structure, as the device moves, data may be exchanged between data aggregators 175 that includes the alert and location functions for the sensor 180, e.g., the instantiation information for the sensor 180. Thus, if a battery alert for the sensor 180 indicates that it needs to be charged, the fog 170 may indicate a closest data aggregator 175 that has a fully charged sensor 180 ready for exchange with the sensor 180 in the portable device.

With the growth of IoT devices and system, there are increasing numbers of smart and connected devices available in the market, such as devices capable of being utilized in home automation, factory automation, smart agriculture, and other IoT applications and systems. For instance, in home automation systems, automation of a home is typically increased as more IoT devices are added for use in sensing and controlling additional aspects of the home. However, as the number and variety of devices increase, the management of "things" (or devices for inclusion in IoT systems) becomes outstandingly complex and challenging.

Some device management applications may be configured with preset settings designed to allow users to set up their systems quickly and with minimal work configuring the device. However, those settings may not be universally desirable, potentially limiting their flexibility and overall utility. In cases, where settings are configurable, a user may nonetheless struggle to make sense of the ideal combination of setting values, resorting to trial and error to figure out the optimal settings for their system (e.g., smart home, office, car, etc.). Indeed, the combination of settings that is ideal or optimal to one user may be subjective, however, other users may still be interested in the setting values determined by others which yielded these other users desirable results. For instance, a guest of a first user may observe, first hand, the configuration of the first user's system and desire to recreate the attributes of the observed system in their own system. However, in traditional systems, system settings are typically not portable due given that they are usually tied to identities of devices.

In traditional systems, each IoT device has its own device's unique media access control (MAC) address or other device identifier. User-customized settings may be tied to a specified device present in the system when the settings were first configured. However, in traditional systems, when a user replaces this device with another (e.g., newer) substitute device, the user is often required to reconfigure the device settings (including device identifier and device MAC address) in the application.

In some implementations, an improved system may be provided with enhancements to address at least some of the example issues above. For instance, In modern societies, large numbers of people carry with them at least one electronic device that possesses network communication capabilities such as a smartphone, smartwatch, wearable, or other mobile device. In addition to network communication, such devices are also typically equipped with resources such as microphones, speakers and a variety of sensors (accelerometer, light, temperature etc.). The near ubiquitous presence of mobile devices, however, present opportunities for a wide array of machine-to-machine networks and corresponding services to be deployed. Gateway devices may be provided, to identify opportunities to interconnect or build services upon collections of devices within an area in an ad hoc and impromptu manner (e.g., without requiring device-specific configurations or user involvement in setting up the network and service).

Services that may be developed, ad hoc, using a collection of detected mobile devices may include examples such as the deployment of an IoT service that intelligently uses the resources of nearby device to facilitate coordinated evacuation/rescue efforts (e.g., involving the users of the devices). For instance, smartphones in an affected area or building may be identified and configured to transmit location beacons, tune microphones to pick up and transmit certain categories of sounds or using speakers to emit sounds on a certain frequency when the device detects a specific sound pattern on another frequency used by rescuers, among other features. In another example, a collection of devices may be identified to provide an impromptu enhancement (video and/or audio) to social events such as concerts, sporting events, and the like (e.g., configuring a collection of smartphone screens or flashlights to create a visual mosaic inside a stadium).

Localized IoT services may also be launched such that they follow a mobile device from location to location, such that consistent IoT services (e.g., tuned to a particular user) are provided on varying sets of IoT devices within each location. For instance, an indoor environment control may be implemented based on smartphone sensor inputs and cause other smart IoT devices providing environmental services (e.g., lights, heating, ventilating, and air conditioning (HVAC) systems, speakers, etc.) to be configured to implement a preferred environment. For example, a system can use inputs from smartphone light and temperature sensors and preconfigured preferences to adjust lighting and heating based on when a person (and their phone) enters or leaves a room (e.g., of a home or office building). Further, IoT configurations and services that are personally adjusted from a "home" IoT system may be transported to other IoT systems being visited (e.g. to recreate aspects of a home environment inside a hotel room, vacation home, etc.). Further, personal IoT configurations and services may be sharable, such that users may access and adopt (or building upon) a desirable configuration created by another user for another set of devices, among other features.

To facilitate the deployment of impromptu IoT systems, improved IoT management functionality may be provided to utilize asset abstraction to significantly reduce the human touch points during deployment and redeployment. For instance, IoT management and applications can adopt a paradigm where, instead of referencing and being programmed to interoperate with specific IoT devices, the system can refer to abstracted classes, or taxonomies, of IoT devices (or "assets"). Asset abstraction can be leveraged to automatically configure a deployed IoT system with minimal human intervention. Indeed, in some instances, configuration of the system can progress without a user having to actually specify which device to use. Instead, a deployment policy can be used instead by the system to automatically select and configure at least a portion of the devices within the system. Further, asset abstraction can facilitate addressing the challenge of portability of IoT applications, which has traditionally limited the general scalability and resiliency of IoT applications.

Asset abstraction can be coupled with automated asset binding, in some cases, to eliminate the necessity of including a device/asset's unique ID in an IoT application or management program. Asset discovery provided with the application or management program can provide an effective means for specifying policy and confining the scope of asset binding. Through the combination of asset discovery, asset abstraction, and asset binding makes IoT applications portable, reusable and sharable.

In some implementations, with asset abstraction, assets are treated indifferently as long they fall into a same category in the taxonomy, e.g., occupancy sensing, image capture, computation, etc. An IoT application, consequently, can be made portable, reusable and sharable, as it can be written and stored in a way that specifies only requirements (e.g., references to abstracted device taxonomies providing the requirements) without specifying the precise identity (or catalogue of identities) of compatible devices meant to provide these requirements. Asset discovery allows all available resources to be searched to detect those meeting the requirements and further selected, in some instances, on the basis of customizable or policy-based criteria.

Figure 2:
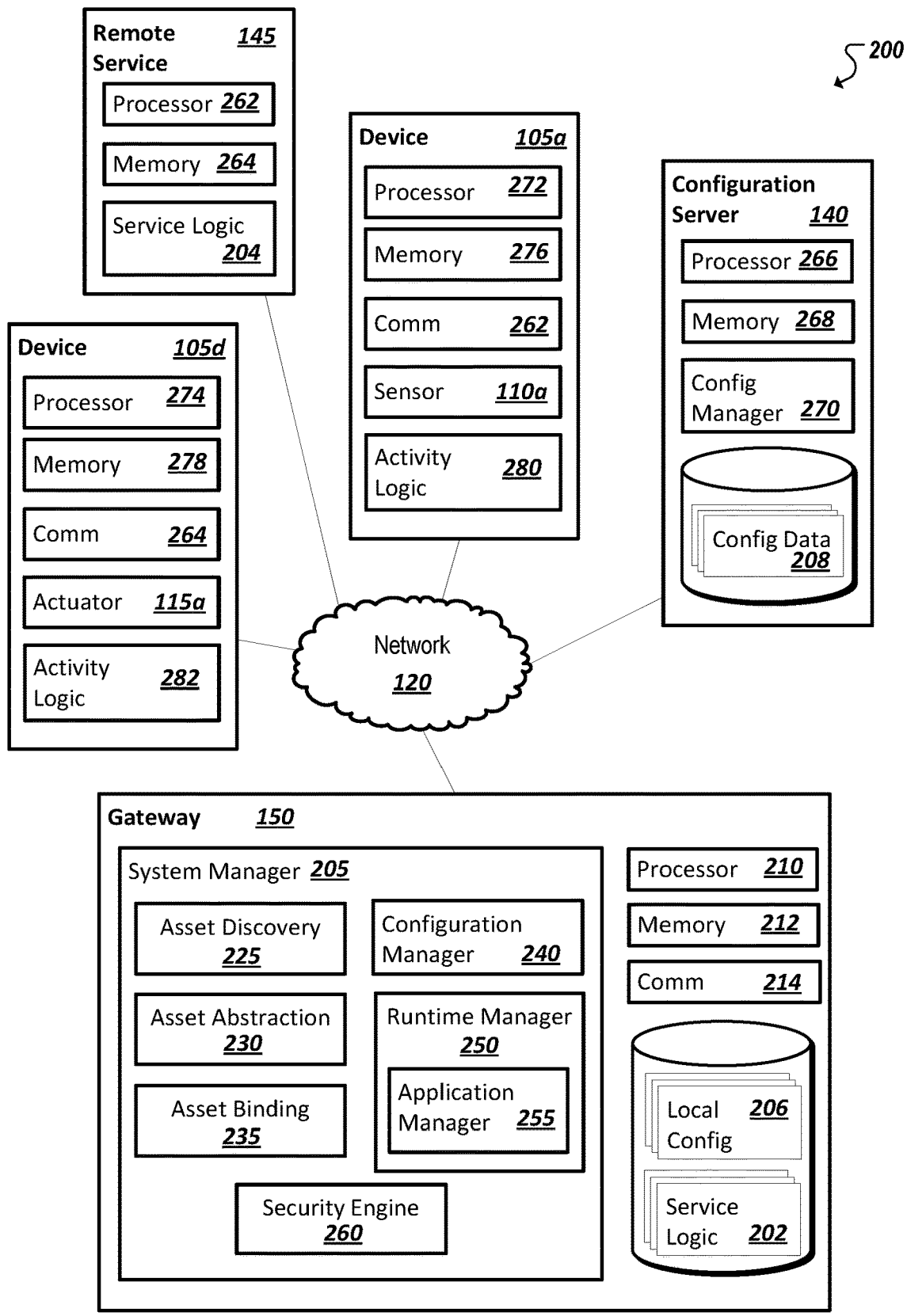
FIG. 2 illustrates an embodiment of a system including an example data management system.

Systems, such as those shown and illustrated herein, can include machine logic implemented in hardware and/or software to implement the solutions introduced herein and address at least some of the example issues above (among others). For instance, FIG. 2 shows a simplified block diagram 200 illustrating a system including multiple IoT devices (e.g., 105*a-c*) with assets (e.g., sensors (e.g., 110*a*) and/or actuators (e.g., 115*a*)) capable of being used in a variety of different IoT applications. In the example of FIG. 2, a gateway device 150 is provided with system manager logic 205 (implemented in hardware and/or software) to detect assets within a location and identify opportunities to deploy an IoT system utilizing the detected assets. In some implementations, at least a portion of the service logic (e.g., 202) utilized to drive the function of the IoT application may be hosted on the gateway 150. Service logic (e.g., 204) may also be hosted (additionally or alternatively) on one or more remote computing devices implementing a server of the service logic 204. Configuration data (e.g., 206, 208) to be used to configure the assets to be utilized in the deployment of the IoT system may also be hosted on the gateway 150 and/or a remote server (e.g., 140), among other example implementations.

In the particular example of FIG. 2, the gateway 150 may include one or more data processing apparatus (or "processors") 210, one or more memory elements 212, and one or more communication modules 214 incorporating hardware and logic to allow the gateway to communicate over one or more networks, utilizing one or more technologies (e.g., WiFi, Bluetooth, Near Field Communications, Zigbee, Ethernet, etc.), with other systems and devices (e.g., 105*a*, 105*d*, 140, 145, etc.). The system manager 205 may be implemented utilizing code executable by the processor 210 to manage the automated deployment of a local IoT system. In one example, system manager 205 may include components such as an asset discovery module 225, asset abstraction manager 230, asset binding manager 235, setting manager 240, configuration manager 245, runtime manager 250, and security engine 260, among other example components (or combinations of the foregoing).

In one example, an asset discovery module 225 may be provide functionality to allow the gateway 150 to determine which IoT devices are within range of the gateway and thus fall within a particular location for which one or more IoT services may be deployed. In some implementations, the asset discovery module 225 makes use of the wireless communication capabilities (e.g., 214) of the gateway 150 to attempt to communicate with devices within a particular radius. For instance, devices within range of a WiFi or Bluetooth signal emitted from the antenna(e) of the communications module(s) 214 of the gateway (or the communications module(s) (e.g., 262, 264) of the assets (e.g., 105*a,d*)) can be detected. Additional attributes can be considered by the asset discovery module 225 when determining whether a device is suitable for inclusion in a listing of devices for a given system or application. In some implementations, conditions can be defined for determining whether a device should be included in the listing. For instance, the asset discovery module 225 may attempt to identify, not only that it is capable of contacting a particular asset, but may also determine assets such as physical location, semantic location, temporal correlation, movement of the device (e.g., is it moving in the same direction and/or rate as the discovery module's host), permissions or access level requirements of the device, among other characteristics. As an example, in order to deploy smart lighting control for every room in a home- or office-like environment, an application may be deployed in a "per room basis." Accordingly, the asset discovery module 225 can determine a listing of devices that are identified (e.g., through a geofence or semantic location data reported by the device) as within a particular room (despite the asset discovery module 225 being able to communicate with and detect other devices falling outside the desired semantic location).

Conditions for discovery can be defined in service logic (e.g., 202, 204) of a particular IoT application. For instance, criteria can be defined to identify which types of resources are needed or desired to implement an application. Such conditions can go beyond proximity, and include identification of the particular types of assets that the application is to use. For instance, the asset discovery module 225 may additionally identify attributes of the device, such as its model or type, through initial communications with a device, and thereby determine what assets and asset types (e.g., specific types of sensors, actuators, memory and computing resources, etc.) are hosted by the device. Accordingly, discovery conditions and criteria can be defined based on asset abstractions (or asset taxonomies) defined for the IoT application. Some criteria may be defined that is specific to a particular asset types, where the criteria has importance for some asset types but not for others in the context of the corresponding IoT application. Further, some discovery criteria may be configurable such that a user can custom-define at least some of the criteria or preferences used to select which devices to utilize in furtherance of an IoT application.

A system manager 205 can also include an asset abstraction module 230. An asset abstraction module 230 can recognize defined mappings between specific IoT devices or, more generally, specific functionality that may be included in any one of a variety of present or future IoT devices with a collection of defined taxonomies, or device abstractions. The asset abstraction module 230 can determine, for each asset discovered by an asset discovery module 225 (e.g., according to one or more conditions), a respective asset abstraction, or taxonomy, to which the asset "belongs". Each taxonomy can correspond to a functional capability of an asset. Assets known or determined to possess the capability can be grouped within the corresponding taxonomy. Some multi-function assets may be determined to belong to multiple of the taxonomies. The asset abstraction module 230 can, in some cases, determine the abstraction(s) to be applied to a given asset based on information received from the asset (e.g., during discovery by asset discovery module 225). In some cases, the asset abstraction module can obtain identifiers from each asset and query a backend database for pre-determined abstraction assignments corresponding to that make and model of asset, among other examples. Further, in some implementations, the asset abstraction module 230 can query each asset (e.g., according to a defined protocol) to determine a listing of the capabilities of the asset, from which the asset abstraction module 230 can map the asset to one or more defined abstraction taxonomies. Asset abstraction module 230 allows the application to treat every asset falling within a given taxonomy as simply an instance of that taxonomy, rather than forcing the system manager 205 to track every possible device model with which it might be asked to manage or service logic 202, 204 to be designed to consider every possible permutation of a particular type of device. Asset abstraction module 225 can access a taxonomy framework (defined on an application-, system-, or universal-basis) that abstracts away the precise device into taxonomies including higher- and lower-level taxonomies for sensing, actuating, computation, storage, and other taxonomies. With asset abstraction, assets are treated indifferently as long they fall into a same category in the taxonomy, e.g., occupancy sensing. Deployment of an IoT application, implemented through its corresponding service logic 202, 204 and configurations 206, 208, may be automated in part through asset abstraction, allowing applications to be developed and deployed without concern for the specific identities of the devices to be used in the system.

A system manager 205 can also include an asset binding module 235 which can select, from the discovered assets, which assets to deploy for a system. In some cases, upon selecting an asset, the asset binding module 235 can operate with configuration manager 245 to send configuration information (e.g., 206, 208) to selected assets to cause each corresponding asset to be configured for use in a particular service. This can involve provisioning the asset with corresponding service logic code (e.g., to allow it to communicate and interoperate with the gateway, a backend server (e.g., 145), and/or other assets selected for deployment), logging in, unlocking, or otherwise enabling the asset, sending session data to or requesting a session with the asset, among other examples. In cases where multiple assets of the same taxonomy have been identified (and exceed a maximum desired number of instances of the taxonomy), the asset binding module 235 can additionally assess which of the assets is the best fit for the deployment. For instance, service logic (e.g., 202, 204) may define binding criteria indicating desirable attributes of assets to be deployed in an application. These criteria can be global criteria, applying to instances of every taxonomy, or can be taxonomy-specific (i.e., only applying to decisions between assets within the same taxonomy). Asset binding can provision the assets specified by the service logic (e.g., 202, 204) for deployment automatically (before or during runtime).

A system manager 205 can additionally provide functionality (e.g., through configuration manager 240) to allow settings to be applied to the selected asset taxonomies (or requirements) of the application 210 and the application 210 generally. A variety of different settings can be provided depending on the collection of assets to be used by the application and the overall objectives of the application. Default setting values can be defined and further tools can be provided to allow users to define their own values for the settings (e.g., a preferred temperature setting of an air conditioned, the number of second to lock a smart lock or locker, sensitivity setting utilized for triggering a motion sensor and control, etc.). What settings constitute the "ideal" may be subjective and involve some tinkering by the user. When the user is satisfied with the settings, the user may save the settings as a configuration. In some implementations, these configurations can be stored locally at a device (e.g., 105a,d), on the gateway 150 (e.g., local configurations 206), or on the cloud (e.g., remote configuration data 208). In some cases, configurations can be shared, such that a user can share the settings they found ideal with other users (e.g., friends or social network contacts, etc.). Configuration data can be generated from which the settings are automatically readopted at runtime by the system manager 205, each time a corresponding service is to deploy (e.g., using whatever assets are currently discoverable within a particular location). Consequently, while specific devices may only be loosely tied to any one user or gateway in a particular deployment of a service, settings can be strongly tied to a user or service, such that the user may migrate between environments and the service may be deployed in various environments, including environments with different sets of assets, with the same settings, or configuration, being applied in each environment. For instance, regardless of the specific device identifiers or implementations selected to satisfy the abstracted asset requirements of an application or service, the same settings can be applied (e.g., as the settings, too, are directed to the abstractions of the assets (i.e., rather than specific assets)). To the extent a particular setting does not apply to a selected instance of a taxonomy, the setting can be ignored. If a selected instance of a taxonomy possesses settings that are undefined by the user in the configuration (e.g., because they are unique to the particular asset), default values for these settings can be automatically set or the user can be alerted that these settings are undefined, among other examples.

A configuration manager 240 may be additionally used in runtime (e.g., during and following deployment of an IoT system) to cause particular settings to be applied at the IoT devices (assets) selected for deployment with the service.

The system manager 205 may include logic enabling the system manager 205 (and its composite modules) to communicate using a variety of different protocols with a variety of different devices. Indeed, the system manager 205 can even be used to translate between protocols to facilitate asset-to-asset communications. Further, the configuration manager 240 can send instructions to each of the selected assets for deployment to prompt each asset to adjust settings in accordance with those defined for the asset taxonomy in the setting configuration defined in configuration data pushed to (or pulled from) the configuration manager 240 during (and potentially also after) deployment.

A system utilizing a gateway enhanced with system manager 205 may be enabled to combine automatic resource management/provisioning with auto-deployment of services. A configuration manager 240 can allow resource configurations from one IoT system to be carried over and applied to another so that services can be deployed in various IoT systems. Further, a runtime manager 250 can be utilized to perform automated deployment and management of a service resulting from the deployment at runtime. Auto-configuration can refer to the configuration of devices with configurations stored locally (e.g., 206) or on a remote node (e.g., 208), to provide assets (and their host devices) with the configuration information to allow the asset to be properly configured to operate within a corresponding IoT system. As an example, a device may be provided with configuration information usable by the device to tune a microphone sensor asset on the device so that is might properly detect certain sounds for use in a particular IoT system (e.g., tune the microphone to detect specific voice pitches with improved gain). Auto-deployment of a services may involves identification (or discovery) of available devices, device selection (or binding) based on service requirements (configuration options, platform, and hardware), and automated continuous deployment (or re-deployment) to allow the service to adapt to evolving conditions.

In one example, a runtime manager 250 may be utilized to direct the deployment and running of a service on a set of devices within a location corresponding to gateway 150. In one example, runtime manager 250 may trigger asset discovery and binding (e.g., by asset discovery module 225 and asset binding manager 235) in connection with the deployment of a particular application. An application manger 255 may be provided for a particular application, or service, and may be used to communicate with deployed devices (e.g., 105a,d) to send data to the devices (e.g., to prompt certain actuators) or receive data (e.g., sensor data) from the devices. Application manager 255 may further utilize service logic and provide received data as inputs to the logic and use the service logic to generate results, including results which may be used to prompt certain actuators on the deployed devices. Runtime manager logic 250 may also be utilized in connection with security management logic 260, to define security domains within a deployment, for instance, to secure communications between one or more of the deployed devices and the gateway and/or communications between the devices themselves.

Portions of the application, or service logic, can be distributed during deployment, with service logic capable of being executed locally at the gateway (or even one of the deployment computing assets) and/or remote from the deployment location on a cloud-based or other remotely-located system (e.g., 145). Indeed, in some cases, the gateway (e.g., using runtime manager 250) may provide one or more assets or their host devices (e.g., 105a,d) with service logic for use during an IoT application's deployment. In some cases, the gateway 150 (and runtime manager 250) may manage deployment and execution of multiple different applications (e.g., with corresponding service logic). Different configurations (e.g., using different configuration data instances) of the same application may also be supported by a single gateway (e.g., 150). Once assets are provisioned, the deployed assets can be used collectively for achieving the goals and functionality designed for the application.

In some implementations a system (e.g., 145) may be provided to host and execute at least a portion of the service logic (e.g., 204) to be utilized to implement an IoT application. In one example, a remote service system (e.g., 145) may be provided and can include one or more processors 262, one or more memory elements 264, among other components. The remote service system 145 may interface with one or more gateways (e.g., 150) used to implement one or more instances, or deployments, of a particular IoT application using one or more networks 120. Data can be provided by the gateways 150 reporting data received from deployed sensor assets (e.g., 110a) or reporting results of other service logic (e.g., 202) executed within a deployed system, and the remote service system 145 can utilize this data as inputs for further processing at the remote service system 145 using service logic 204. The results of this processing may then be returned by the remote service system 145 to the requesting gateway (or even a different gateway) to prompt additional processing at the gateway and/or to trigger one or more actuator assets (e.g., 115a) to perform or launch one or more tasks or outcomes of the IoT application.

Configuration may also be assisted by remotely located (e.g., cloud-based) systems (e.g., 140). For instance, a configuration server 140 may be provided that includes one or more processors 266, one or more memory elements 268, among other components. In some cases, remote systems may simply host various configuration data describing various configurations that may be accessed by and applied in a deployment of an IoT system by a gateway 150. In other cases, a configuration server (e.g., 140) may include a configuration manager (e.g., 270) to coordinate with a gateway 150 to identify configuration data for a particular deployment. Configuration data supplied by a configuration servicer (e.g., 140) may replace, supersede, or supplement local configuration data 206. A configuration server 140 may also facilitate the sharing and offloading of configuration data (e.g., 208) across platforms, making IoT system configurations "portable" between systems and locations (e.g., which may utilize different gateways (e.g., 150) with access to varied local configurations), among other examples. Further, a remote configuration manager 270 may replace, supersede, or supplement the functionality of configuration management logic (e.g., 240) local to various gateways (e.g., 150). Likewise, other functionality of the system manager 205 may also be provided remote from the gateway 150 as a service, such as asset abstraction and binding managers (e.g., 230, 235), application manager 255, among others. provided for the s (e.g., 150)

As noted above, asset abstraction can assist not only in easing the deployment of a system and propagating configurations across multiple different systems, but abstraction may also be used to enhance the programming of IoT applications. For instance, development systems may be provided which supplement traditional programming tools (e.g., for use in coding an application) with declarative programming tools allowing users, including novice programmers, to specify generalized or abstracted requirements of the IoT application, expressed as collections of asset taxonomies. The user may additionally declare relationships between two or more of the selected taxonomies to indicate input-output, sensor-actuator, or other relationships that are to be automatically defined in corresponding application code and thereby develop new IoT applications (and corresponding service logic (e.g., 202, 204) based on these abstractions. Such a development paradigm may allow an IoT application to be programmed once and deployed everywhere. As an example, an evacuation IoT service may be developed in advance of and independent of the identities of the physical devices that will be used to implement the service, and the physical deployments may be later and automatically deployed based on the defined abstractions in the corresponding service logic.

Continuing with the description of FIG. 2, each of the IoT devices (e.g., 105a,d) may include one or more processors (e.g., 272, 274), one or more memory elements (e.g., 276, 276), and one or more communications modules (e.g., 262, 264) to facilitate their participation in various IoT application deployments. Each device (e.g., 105a,d) can possess unique hardware, sensors (e.g., 110a), actuators (e.g., 115a), and other logic (e.g., 280, 282) to realize the intended function(s) of the device. For instance, devices may be provided with such resources as sensors of varying types (e.g., 110a, 110c), actuators (e.g., 115a) of varying types, energy modules (e.g., batteries, solar cells, etc.), computing resources (e.g., through a respective processor and/or software logic), security features, data storage, and other resources.

Figure 3A:
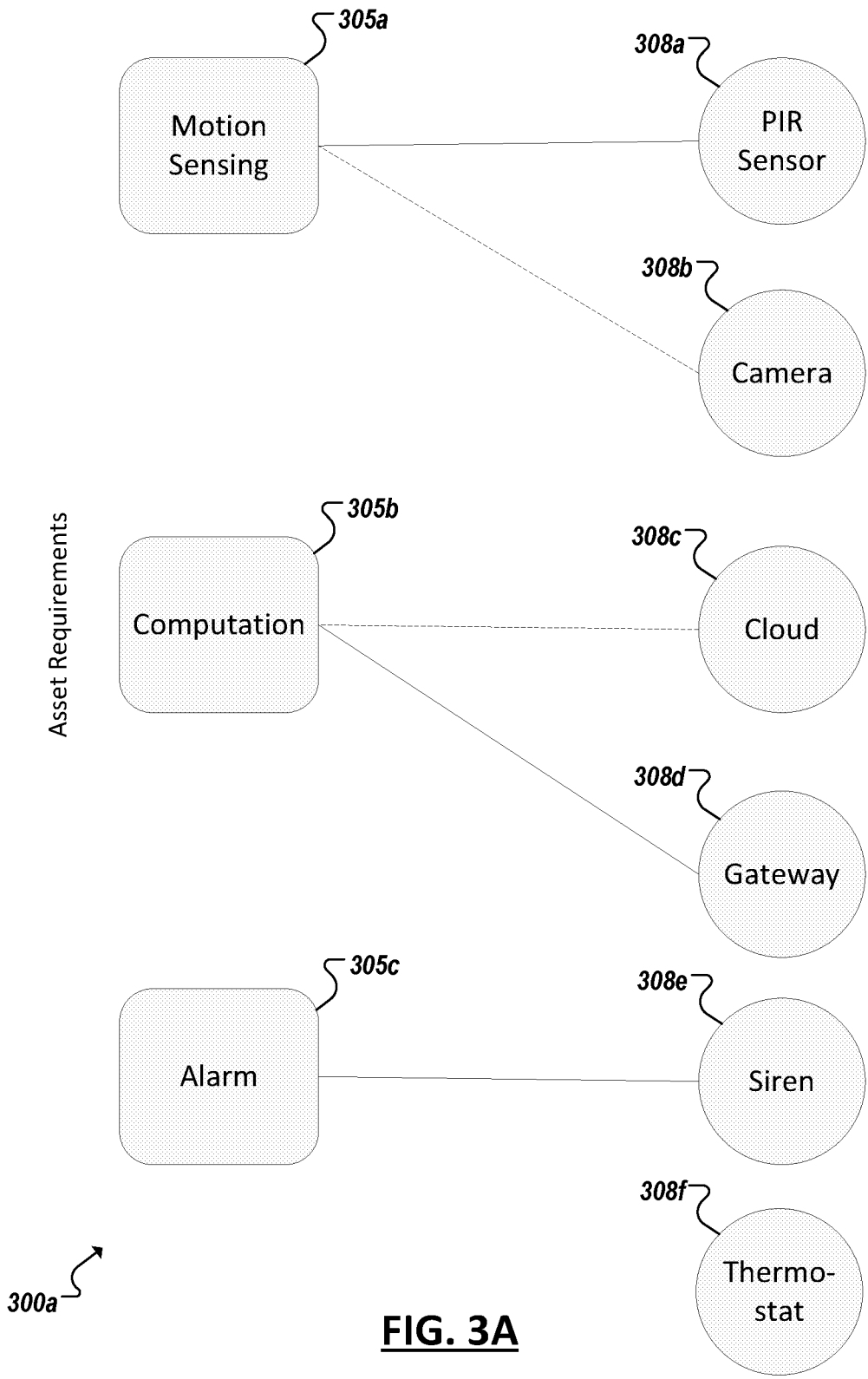
FIG. 3A is a simplified block diagram illustrating an example of asset abstraction and binding.

Turning to FIG. 3A, a simplified block diagram 300a is shown representing a simplified example of asset abstraction. A variety of different taxonomies can be defined at varying levels. For instance, a sensor taxonomy can be a parent to a multitude of specific sensor-type taxonomies (e.g., child taxonomies for light sensing, motion sensing, temperature sensing, liquid sensing, noise sensing, etc.), among other examples. In the example of FIG. 3A, an IoT application has been defined to include three asset requirements, represented by taxonomies Motion Sensing 305a, Computation 305b, and Alarm 305c. During asset discovery, a variety of assets (e.g., 308a-f) can be identified as usable by the application (e.g., based on the assets meeting one or more defined discovery conditions). One or more corresponding taxonomies, or abstractions, can be identified (e.g., by an IoT management system) for each of the assets 308a-f. Some of the abstractions may not have relevance to the asset requirements and function of the application, such as an abstraction (e.g., Temperature Sensor and/or HVAC Actuator) determined for thermostat device 308f. Other asset abstractions may match the abstractions (e.g., 305a-c) designated in the IoT application as asset requirements of the application. Indeed, more than one discovered asset may be fit one of the asset requirements. For instance, in the example of FIG. 3A, a PIR sensor 308a and camera 308b are each identified as instances of a motion sensing asset taxonomy 305a. Similarly, a cloud-based computing resource 308c and network gateway 308d are identified as instances of a computation asset taxonomy 305b. In other instances, there may be just a single discovered device satisfying an application asset requirement (e.g., siren 308e of the alarm taxonomy 305c), among other examples.

Conventionally, IoT and wireless sensor network (WSN) applications have been developed to intricately define dataflow among a determined set of physical devices, which involves device-level discovery in development time to obtain and hardcode the corresponding device identifiers and characteristics. By utilizing asset abstraction, development can be facilitated to allow the devices to be discovered and determined at runtime (e.g., at launch of the application), additionally allowing the application to be portable between systems and taxonomy instances. Further, development can be expedited by allowing developers to merely specify asset requirements (e.g., 305a-c), without the necessity to understand radio protocol, network topology, and other technical features.

In one example, taxonomies for asset abstraction can involve such parent taxonomies as sensing assets (e.g., light, presence, temperature sensors, etc.), actuation (e.g., light, HVAC, machine controllers, etc.), power (e.g., battery-powered, landline-powered, solar-powered, etc.), storage (e.g., SD, SSD, cloud storage, etc.), computation (e.g., microcontroller (MCU), central processing unit (CPU), graphical processing (GPU), cloud, etc.), and communication (e.g., Bluetooth, ZigBee, WiFi, Ethernet, etc.), among other potential examples. Discovering which devices possess which capabilities (and belong to which taxonomies) can be performed using varied approaches. For instance, some functions (e.g., sensing, actuating, communication) may be obtained directly from signals received from the device by the system management system via a common descriptive language (e.g., ZigBee's profiles, Bluetooth's profiles and Open Interconnect Consortium's specifications), while other features (e.g., power, storage, computation) may be obtained through deeper queries (utilizing resources on top of the operating system of the queried device), among other examples.

Asset binding can be applied to determine which discovered assets (fitting the asset requirements (abstractions) defined for an application) are to actually be deployed. Criteria can be defined at development time and/or before/at runtime by the application's user, which an IoT system manager (e.g., 205) can consult to perform the binding. For instance, as shown in FIG. 3A, according to the criteria set forth for the application (or for a particular session using the application), one of multiple matching assets for a required taxonomy can be selected. For instance, between PIR sensor 308a and camera 308b, corresponding criteria (e.g., criteria to be applied generally across all taxonomies of the application and/or taxonomies specific to the motion sensing taxonomy 305a) can result in PIR sensor 308a be selected to be deployed to satisfy the motion sensing asset requirement 305a of the application. Similarly, criteria can be assessed to determine that gateway 308d is the better candidate between it and cloud resource 308c to satisfy the application's computation requirement 305b. For asset requirements (e.g., 305c) where only a single discovered instance (e.g., 308e) of the asset taxonomy is discovered, asset binding is straightforward. Those discovered devices (e.g., 308a, 308d, 308e) that have been selected, or bound, can then be automatically provisioned with resources from or configured by the IoT system manager (e.g., 205) to deploy the application. Unselected assets (e.g., 308b, 308c, 308f) may remain in the environment, but are unused in the application. In some instances, unselected assets can be identified as alternate asset selections (e.g., in the event of a failure of one of the selected assets), allowing for swift replacement of the asset (deployed with the same settings designated for instances of the corresponding taxonomy).

In some instances, asset binding can be modeled as a bipartite matching (or assignment) problem in which the bipartite graph can be expressed by $G=(R,A,E)$ where R denotes the asset requirements, A denotes the available assets and e=(r,a) in E where a in A is capable of r in R. Note that if R requests for n instances of a particular assets, A' can be defined as:

$$\bigcup_n A$$

from which a solution for the (maximum) (weighted) matching problem can be computed. For instance, exhaustive search can be applied as the number of vertices in the bipartite graph are small and the edges are constrained in the sense that there is an edge (r,a) only if a is capable of r.

Figure 3B:
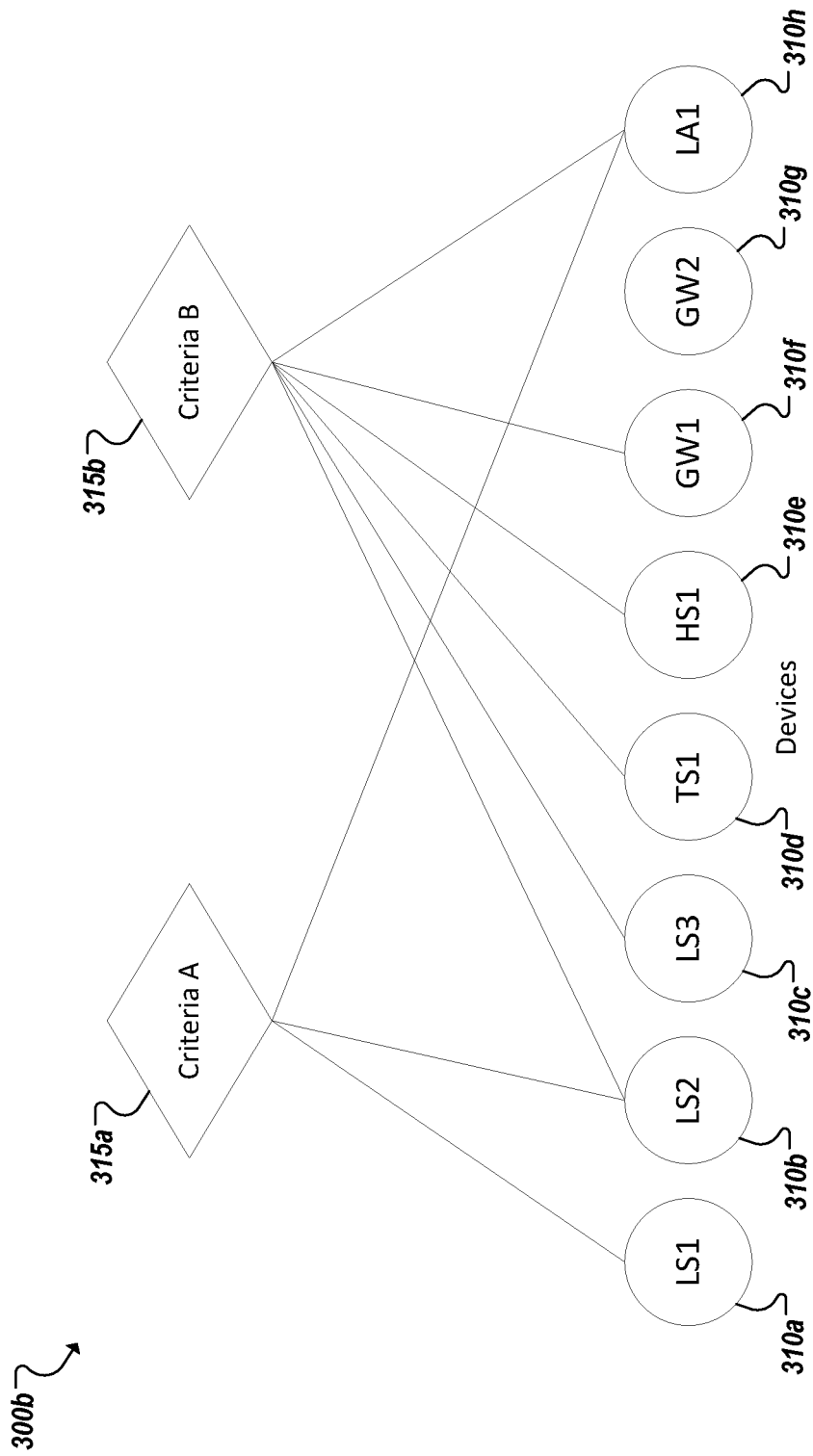
FIG. 3B is a simplified block diagram illustrating an example of asset discovery.

Turning to the simplified block diagram 300b of FIG. 3B, an example of asset discovery is represented. Asset discovery can allow the scope of available devices to be confined based on discovery conditions or criteria, such as conditions relating to device proximity, room, building, movement state, movement direction, security, permissions, among many other potential (and configurable) conditions. The benefits of such targeted discovery can trickle down to asset binding, as unchecked discovery may return many possible bindings, especially in large scale deployment. For example, in a smart factory, the action of "deploying predictive maintenance" may be ambiguous as there may be hundreds of sensors, motors, alarms, etc. in a factory facility. Asset discovery, in some implementations, takes as input a policy or user input from which a set of discovery criteria can be identified. Upon detecting the universe of assets with which the application could potentially operate, the criteria can be used to constrain the set, in some cases, providing a resulting ordered list of available assets, which can be expressed as f:C×D→D, where C denotes criteria, D denotes a set of devices, and the codomain is a totally ordered set.

For instance, in the example of FIG. 3B, two discovery criteria 315a, 315b are identified for an application. Additional criteria may be defined that is only to apply to some or a specific one of the categories, or taxonomies, of assets, among other examples. Based on the defined criteria 315a-b in this example, the output of discovery according to search criteria A 315a leads to the codomain of a subset of devices in the environment—LS1 (310a), LS2 (310b), GW2 (310g) and LA1 (310h), whereas search criteria B results in LS2 (310b), LS3 (310c), TS1 (310d), HS1 (310e), GW1 (310f), and LA1 (310h). Based on the set of defined discovery criteria (e.g., 315a-b), asset discovery can attempt to reduce the total collection of identified assets to a best solution. Additionally, determining the set of discovered assets for binding consideration can incorporate determining a minimum set of discovered devices, based on the asset requirements of the application. For instance, a minimum set can be selected during discovery such that at least one asset of each required taxonomy is present in the set, if possible. For instance, in the example of FIG. 3B, it can be identified (e.g., by an asset discovery module of the system manager) that application of only criteria B (315b) in discovery yields at least one asset for each of the taxonomies defined for the application.

Figure 3C:
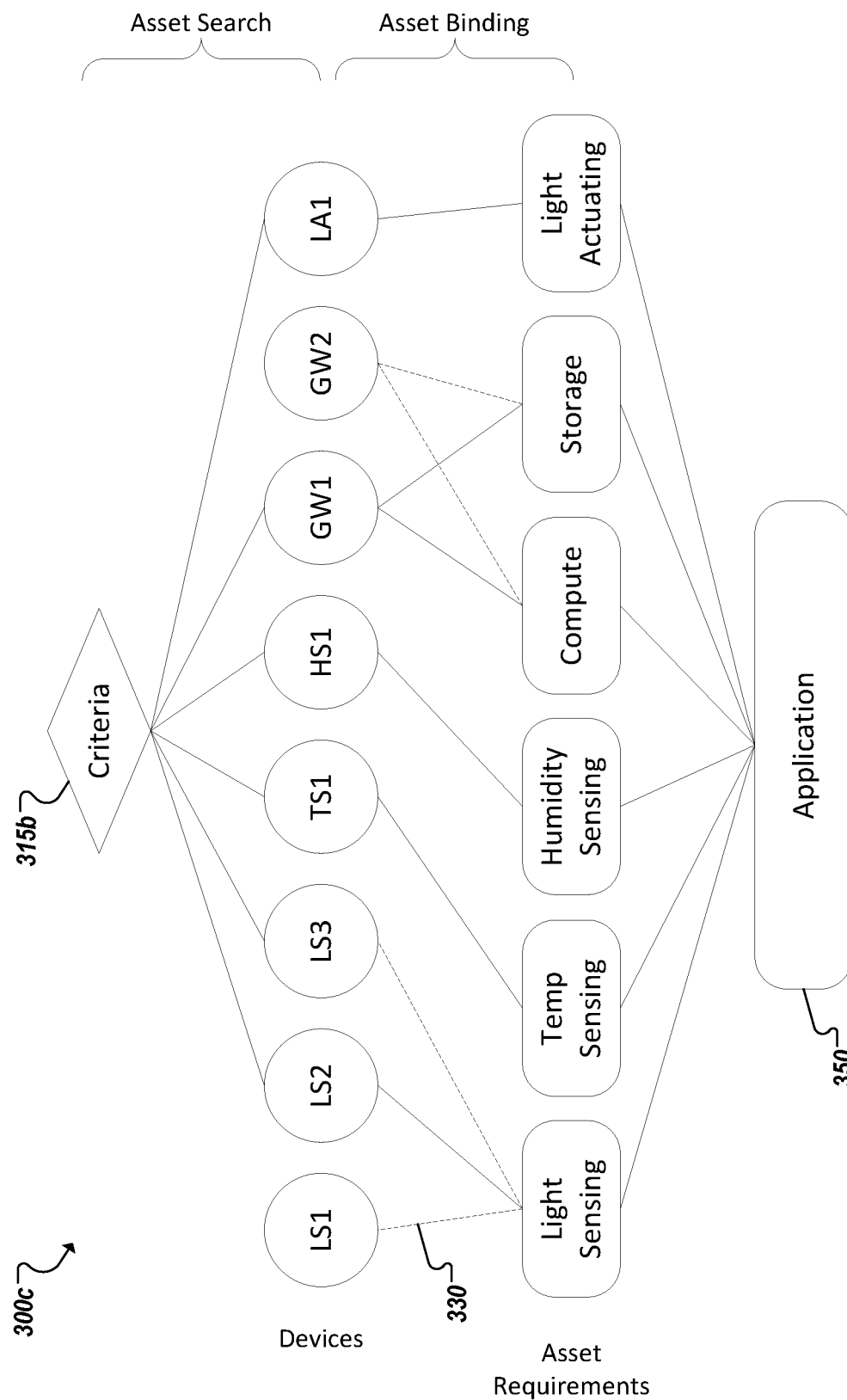
FIG. 3C is a simplified block diagram illustrating an example of asset abstraction and binding using a discovered set of assets.

For instance, the block diagram 300c FIG. 3C illustrates the end-to-end deployment determinations of a system manager for a particular IoT application 350. For instance, based on the discovery conducted in the example of FIG. 3B, a subset of the assets (e.g., LS2 (310b), LS3 (310c), TS1 (310d), HS1 (310e), GW1 (310f), and LA1 (310h)) are "discovered" for potential use by the application (e.g., based on their compliance with criteria B (and the underrepresentation of assets in compliance with criteria)). Accordingly, assets LS1 and GW2 are not to bound to the corresponding IoT application 350 (as indicated by the dashed lines (e.g., 330)), despite each asset being an instance of one of the asset requirements (e.g., Light Sensing, Compute, and Storage) of the application 350.

As noted above, additional criteria can be defined and applied during asset binding. During binding, where the set of discovered assets include more than one instance of a particular required asset taxonomy (e.g., as with assets L2 and L3 in asset taxonomy Light Sensing), criteria can be applied to automatically select the asset that is the better fit for deployment within the IoT system governed, controlled, or otherwise supported by the application 350. Further, as illustrated in FIG. 3C, it is possible for a single asset instance (e.g., GW1) to both belong to two or more taxonomies and to be selected for binding to the application for two or more corresponding asset requirements (e.g., Compute and Storage), as shown. Indeed, a binding criterion can be defined to favor opportunities where multiple asset requirements of the application can be facilitated through a single asset, among other examples.

As represented generally in FIG. 3C, asset discovery can provide the first level for confining the scope of an asset-to-application asset requirement mapping. A user or developer can specify (in some cases, immediately prior to runtime) the asset requirements for a particular application 350, and an environment can be assessed to determine whether assets are available to satisfy these asset requirements. Further, the system manager utility can automatically deploy and provision discovered assets to implement that application, should the requisite combination of assets be found in the environment. Additionally, the system manager utility can automatically apply setting values across the deployed assets in accordance with a configuration defined by a user associated with the application. However, if no instances of one or more of the asset requirements (required taxonomies) are discovered, the application may be determined to be un-deployable within the environment. In such cases, a system manager utility can generate an alert for a user to identify the shortage of requested taxonomy instances, including identifying those taxonomies for which no asset instance was discovered within the environment, among other examples.

Figure 4:
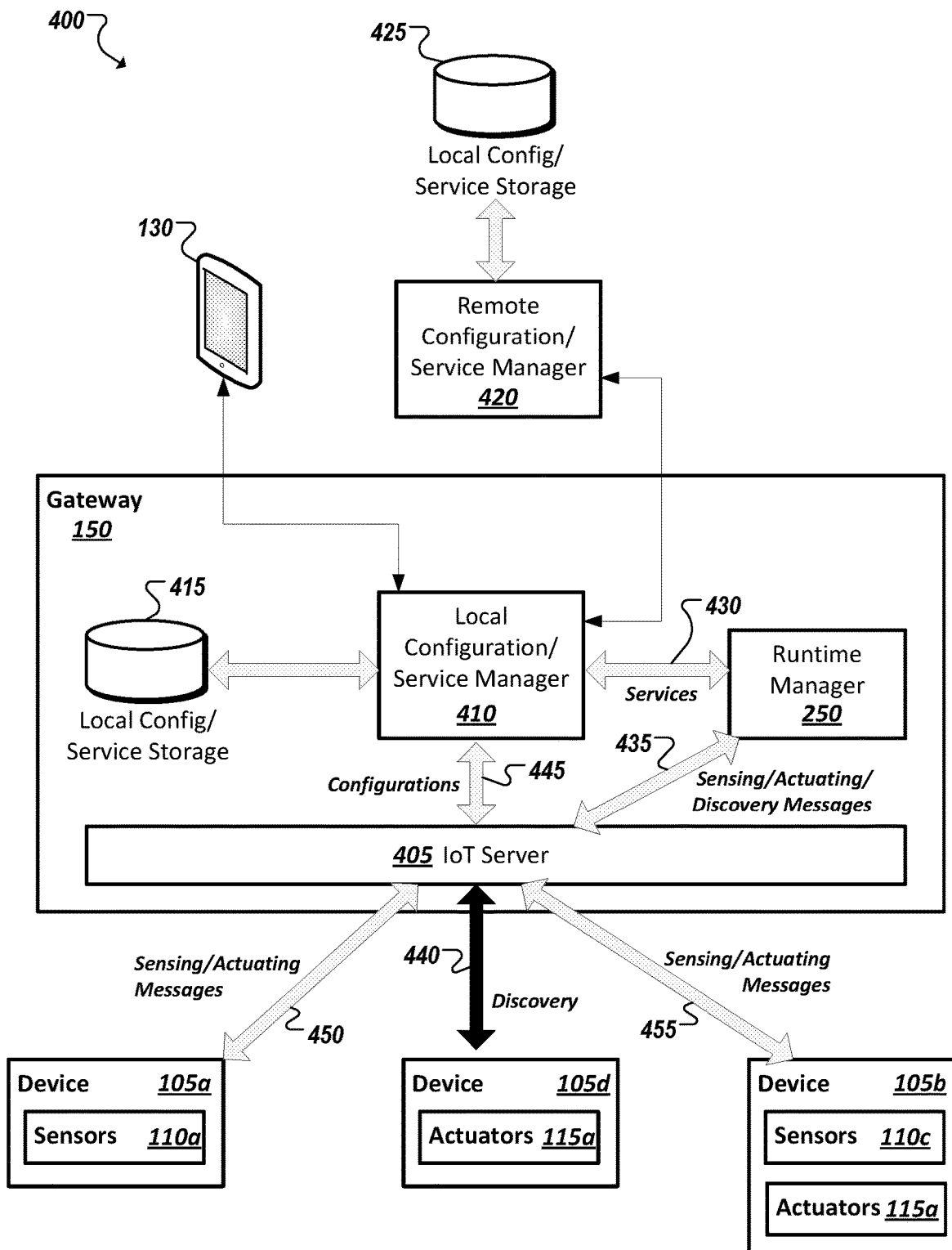
FIG. 4 is a simplified block diagram illustrating an example gateway device used to deploy a particular machine-to-machine system.

Turning FIG. 4, a simplified block diagram 400 is shown illustrating an example deployment of an IoT application using an enhanced gateway 150. The gateway 150 may include an IoT server 405 to serve one or more IoT applications using various combinations of devices (e.g., 105a,b,d) within wireless communication range of the gateway 150. The gateway 150 may additionally include a local configuration/service manager 410 (e.g., implementing functionality combining configuration manager 240 and application manager 255 of FIG. 2) which may manage access to local and remote configuration data and service logic as well as the provisioning of devices (e.g., 105a,b,d) in an IoT deployment with the same. Local configuration data and service logic may be stored in local storage 415 of the gateway 150. Additional configuration data and service logic may also be accessed and utilized by the gateway 150 by accessing (e.g., through configuration/service manager 410) one or more remote configuration and/or service managers (e.g., collectively 420) serving configuration data and/or service logic (e.g., at data store(s) 425). Further, an end user device 130, such as the device of a user administrating or otherwise associated with a particular IoT application deployment, may provide additional configuration data and/or service logic for use by the gateway. Selection of the particular configuration data or service logic (e.g., from remote or local configuration storage) to be used in the deployment may be controlled by a user through user device 130, among other examples. Whether the configuration data or service logic originates from remote storage (e.g., 425), from a user device 130 (or other device (e.g., 105a) to be potentially included in the deployed IoT application), local storage of the gateway 150, or another source, the configuration data or service logic is to be first provided to the configuration/service manager 410 on the gateway 150 before being used for runtime deployment.

The gateway 150, itself, may be configured to deploy various instances of the same IoT applications or of different IoT applications. Settings of each of these deployment instances may be pre-programmed or may be provided by an administrator (e.g., through an application on a user device (e.g., 130) in communication with the gateway 150), and these settings may be defined in and implemented through service logic and configuration data the gateway utilizes in runtime deployment of an IoT application. For instance, a service manager (e.g., 410) of the gateway 150 may determine that particular service logic is to be employed for a particular IoT application deployment. The service logic may be accessed from local storage 415 and may, in some cases, indicate coordination with one or more other systems (e.g., 420) running additional service logic remote from the gateway 150, which the local service manager 410 is to request and utilize in certain circumstances and transactions. Upon identifying the service logic to use, the service manager 410 can provide the service logic 430 to the runtime manager 250 to initiate deployment of a corresponding IoT application.

Service logic (and the services provided through its execution) may define interactions between devices and the actions that are to be performed through the IoT application's deployment. The service logic may identify the assets required or desired within the deployment and may identify the same by asset abstraction. Further, interactions or relationships between the devices may also be defined, with these definitions, too, being made by reference to respective asset abstractions. Accordingly, the service logic can define the set of devices (or device types) that is to be discovered by the gateway and drive the discovery and binding processes used to identify and select a set of devices (e.g., 105a,b,d) to be used in the deployment.

The service logic may be carried out locally by the runtime manager 250. In some cases, the service can be implemented as a script and be utilized to trigger events and actions utilizing the deployed devices. As noted above, the service logic may also identify conditions where outside computing resources, such as a system hosting remote service logic is to be called upon, for instance, to assist in processing data returned by sensors in IoT application deployment. Services (performed locally or remotely through corresponding service logic) may include the receiving of inputs, such as sensor readings, static values or actuator triggers, functions, processes, and calculations to be applied to the inputs, and outputs generated based on the function results, which may in turn specify certain actions to be performed by an actuator or results to be presented on a user device (e.g., 130), among other examples. In some cases, portions of service logic may be distributed to computing resources, or assets, within the deployed IoT application, and a portion of the input processing and result generation for a deployment may be performed by computation assets on the deployed devices (e.g., 105a,b,d) themselves. Such results may in turn be routed through or returned to the gateway for further processing (e.g., by service logic local to the gateway 150 or by service logic executed on a cloud-based backend system (e.g., 420), etc.).

Service deployment may begin with running the provided service logic on the runtime manager 250. The runtime manager 250 can process the logic to identify a set of asset abstractions mapped to requirements of the IoT application. Identification of these abstractions may prompt initiation of an asset discovery stage 440 (e.g., performed through the IoT Server 405). During discovery devices within communication range of the gateway 150 may be discovered together with identifier information of each device to allow the gateway 150 to determine which asset abstraction(s) may be mapped to each device (with its respective collection of assets). In the event that more assets of a particular type are identified within the location than are needed, the gateway can additional perform a binding analysis (according to one or more binding criteria) to select which device(s) to bind to one or more corresponding asset abstractions.

With the set of devices selected for a corresponding IoT application deployment, automated configuration of the devices may be performed by the gateway 150. Configuration data may embody a configuration that identifies one or more static settings relevant to a particular device to which the configuration is being applied. Multiple configurations may be provided for use in provisioning multiple different types of devices in a given deployment. Various configuration data in data stores may describe multiple, different preset configurations, each tailored to a specific scenario or deployment. In a particular deployment, configuration data may be provided for each asset abstraction, or taxonomy, to be included in a corresponding IoT application (e.g., programmed according to the asset abstractions). Configuration data may be provided in a standard format, such as XML, JSON or CBOR file, among other examples. The local configuration manager (e.g., 410) may handle the deployment of configurations on the discovered devices (e.g., 105a,b,d). The communication between the gateway 150 and the devices (e.g., 105a,b,d) in a corresponding location or coverage area may be handled by the IoT server component 405. The IoT server 405 may additionally support protocol adaptation and connection management to facilitate potentially multiple distinct (and contemporaneous) deployments of one or more IoT applications (which potentially employ devices with differing communication capabilities and use various communication protocols, etc.). Configuration data is sent from the local configuration manager to corresponding devices discovered and selected for deployment in a particular IoT application, Depending on the number of devices, hardware capabilities of the local gateway 150 and the local network bandwidth and latency each device (e.g., 105a,b,d) in a deployment, the gateway 150 may either send configuration data directly to each of the IoT devices in the deployment or may utilize one or more of the devices to distribute configuration data to other devices in a peer-to-peer fashion, among other examples.

The runtime manager 250 may define messages (e.g., 435) to be passed to the various devices in range of the gateway 150 to facilitate discovery of the devices (as well as ongoing discovery of new devices following deployment) and delivery of configuration data to the appropriate devices (e.g., 105a,b,d). In some cases, the configuration manager 410 of the gateway 150 can identify the appropriate configurations corresponding to the discovered devices (e.g., 105a,b,d) and provide corresponding configuration data (at 445) to the IoT server 405 for distribution (directly or through P2P sharing) of the configuration data to the appropriate devices. For devices (e.g., 105a,b) including sensor assets (e.g., 110a, 110c), configuration data may indicate to the asset (and its host device) how it is to collect and relay data using the sensors. For instance, configuration data may be utilized by the host device to cause data to be collected, generated, or reported at a particular interval, to tune the sensor to certain settings, to apply a filter to the information sensed by the sensor, among other examples. For devices (e.g., 105b,d) including actuator assets (e.g., 115a), configuration data may indicate to the asset how to respond to inputs (e.g., provided through the gateway) and perform activities in response to these requests. For instance, the configuration data for an actuator asset may cause an actuator to wait for certain commands or messages 450, 455 (e.g., from the IoT server 405) before an action, to tune its actions to particular settings, select which actions are performed or how they are performed through the actuator, among other examples. Additional configuration data may be provided in some implementations for other asset taxonomies (e.g., other than actuator and sensor asset taxonomies), which may be included in some IoT application deployments. As an example, service logic may facilitate the deployment of a portion of a fog or the deployment of multiple physical assets to implement a single logical asset (for which corresponding configuration may also be provided and defined), among other example implementations.

With the configuration data 445 provided to the discovered devices (e.g., 105a,b,d) initial deployment may be considered complete and devices (e.g., 105a,b,d) and their respective assets (e.g., 110a, 110c, 115a, etc.) may operate in accordance with the configurations provided them. Accordingly, during runtime, sensing messages (e.g., 450, 455) may be sent up to the gateway 150 from the devices (e.g., 105a,b,d). Runtime manager 250 can receive the sensing messages (at 435) and utilize service logic either local to or remote from the gateway 150 to process the sensor data as inputs. One or more results may be generated from the processing and used as the basis of actuating messages sent from the runtime manager 250 to the IoT server (at 435) for delivery (at 450, 455) to one or more specific actuator assets (e.g., 115a on devices 105b and/or 105d) to cause a corresponding activity to be performed. In this manner, a system of IoT service deployment and resource management may be provided which enables auto-configuration of devices and fast deployment of services making use of those configurations, all with minimal (and in some cases no) involvement of a user.

Figure 5:
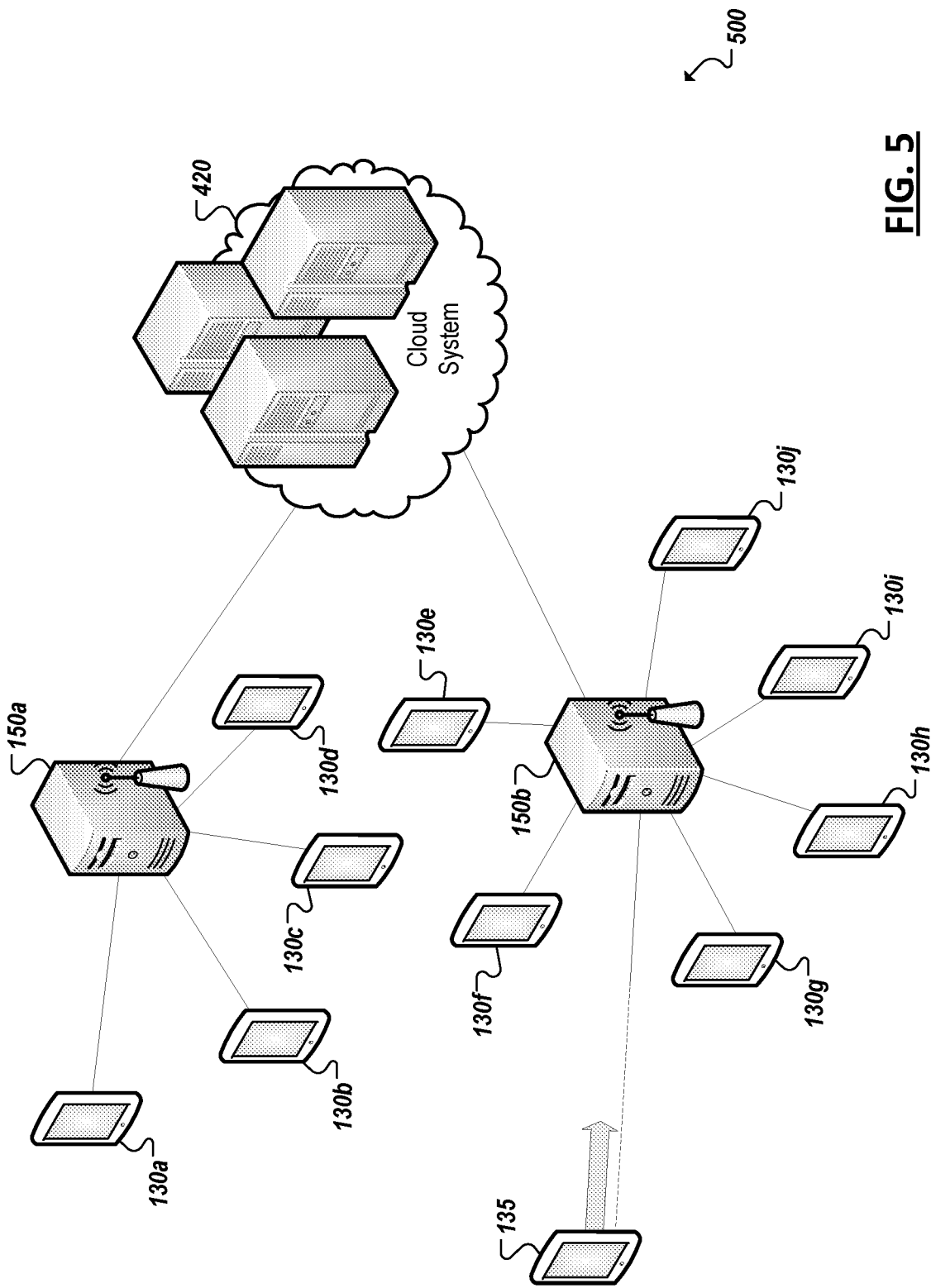
FIG. 5 is a simplified block diagram illustrating an example machine-to-machine system.

Turning to FIG. 5, a simplified block diagram 500 is shown illustrating an example of an automated deployment and configuration of a system in a location that utilizes two or more gateways (e.g., 150a-b) to facilitate IoT applications deployments at the location. In this particular example, a number of smartphone devices 130a-j (or other mobile devices) have been detected within an area. Each of the devices may be in range of one or more of multiple gateways 150a-b in the location. Each of the gateways 150a-b may discover those devices satisfying criteria of a particular IoT application and within range of the gateway, access configuration data relating to a deployment of the particular IoT application, and provide this configuration data to each of the selected devices (e.g., 130a-j). Different models (and even types) of mobile devices 130a-j may be discovered along with the types of assets provided on each mobile device. For instance, some devices (e.g., 130a-j) may have a LCD display screen while others may not, some device may have a flashlight, some a camera, some a speaker, etc. The configuration data provided to each device may be specific to the particular asset types discovered for each device (e.g., 130a-j). The configuration data may indicate to the devices how to utilize their respective assets (e.g., actuators, sensors, etc.) with a particular IoT application.

As an illustrative example, the gateways 150a-b may be gateways provided in a large public space, such as a stadium, school, arena, airport, train station, park, or other venue. An example IoT application may provide for emergency events to be reported or detected using sensors of individual mobile devices (e.g., 130a-j) and for determined emergency events to trigger a siren or alarm to be collectively output from the speakers of each of the mobile devices in the area (and connected to one of the gateway 150a-b). A configuration may be provided to indicate that a user input (e.g., through a touchscreen of corresponding app on the mobile device) indicating an emergency event (observed by the user) be reported automatically to the gateway. Configuration data may also, or alternatively, direct sensors on the device (e.g., camera, microphones, accelerometers, etc.) to collect certain information and report this information to a nearest gateway, for processing by service logic at the gateway (or a backend system 420) to determine an emergency situation from data collected from one or more of the devices in range of the gateway. As noted above, a user may enable a device's participation in such an IoT system by installing and activating a corresponding app (e.g., that is enabled or prompts a user for permission to join an emergency management IoT application deployment anytime it detects a gateway supporting the corresponding service). The gateway may deploy an impromptu, ad hoc instance of the IoT application any time it detects one or more compatible devices (e.g., 130a-j) within range of one or more gateways (e.g., 150a-b) deployed at a given location.

Continuing with the foregoing example, upon receiving data from one or more mobile devices (e.g., 130a-j), one or more of the gateways 150a-b may access service logic and determine whether an emergency situation exists that should prompt an alert. In some cases, the gateway 150a-b may send requests to a backend service (e.g., 420) to assist in the determination of the emergency. Reliance on a backend service may be utilized in implementations, such as shown in the example of FIG. 5, where multiple discrete gateway devices (e.g., 150a-b) are utilized to launch a single IoT application deployment. For instance, a backend service (e.g., 420) may orchestrate coordination of the multiple gateways (e.g., 150a-b), for instance, by aggregating data collected by the multiple gateways to return a result or by communicating a result determined locally at one of the gateways (e.g., 150a) to one or more of the other gateways (e.g., 150b) in the location. For instance, service logic of an IoT application may dictate that an emergency situation is to be determined if user inputs (e.g., via a touchscreen sensor or microphone sensor asset) are received from two or more of the devices (e.g., 130a-j) within a defined window of time. For instance, gateway 150a may receive two contemporaneous sensor data inputs from devices 130a and 130c and may use service logic to determine that each sensor data input reports an emergency situation (e.g., a threat, an accident, a natural disaster, a medical emergency, etc.) and determine that these inputs should result in an alarm. The gateway 150a may communicate this determination to one or more of the other gateways (e.g., 150b) in the area either directly (e.g., in a machine-to-machine inter-gateway message) or via an intermediary network or system (e.g., system 420). The gateways 150a-b may then send actuator messages to each of the devices 130a-j (detected as having speakers) within range of the respective gateway to cause a particular alarm (e.g., one of multiple different alarms indicating a particular type of emergency) to be presented (e.g., at a particular volume) on each of the devices 130a-j simultaneously (or in a determined orchestrated pattern). This alarm, collectively sounded by the multiple devices 130a-j within the location may alert not only the devices' users but standers-by of a nearby emergency situation.

Further, as illustrated in FIG. 5, automatic deployment and configuration of assets may be take place in a continuous manner. For instance, a gateway (e.g., 150a-b), after initially deploying and configuring an IoT application deployment may continue to detect the entry of new devices (e.g., 135) into the range of the gateway (e.g., 150b). While the other, already-deployed assets operate with the gateway in runtime, the gateway may continue to actively discover new devices that may be utilized in the deployment. For instance, a new device 135 may be discovered and its collective assets identified by the gateway 150b. The gateway 150b may identify configurations to push down to the new device 135 and cause the device 135 to join the deployment. Likewise, the gateway may identify when devices leave an area (and are no longer in communication with the gateway), thereby removing the exiting device from the deployment. In some cases, a device may depart a deployment and thereby take with it an asset type needed for a given deployment (e.g., the only asset detected as currently meeting a particular asset abstraction requirement for a corresponding IoT application). In such cases, the departure of an asset may trigger an attempt to discover new devices (to replace the departing asset) or even the closing of the IoT application session.

It should be appreciated that the example presented above is provided for illustration purposes only and is but one of potentially limitless example IoT applications that may deployed automatically in a location using one or more local gateway devices (e.g., 150a-b). It should be further appreciated that potentially any collection of devices (e.g., and not simply end user mobile devices) may be discovered and utilized by an enhanced gateway in deployment of an IoT application (including diverse collections of devices of multiple different types). Indeed, asset abstraction allows for superior flexibility in allowing such deployments and automated configurations.

Figure 6:
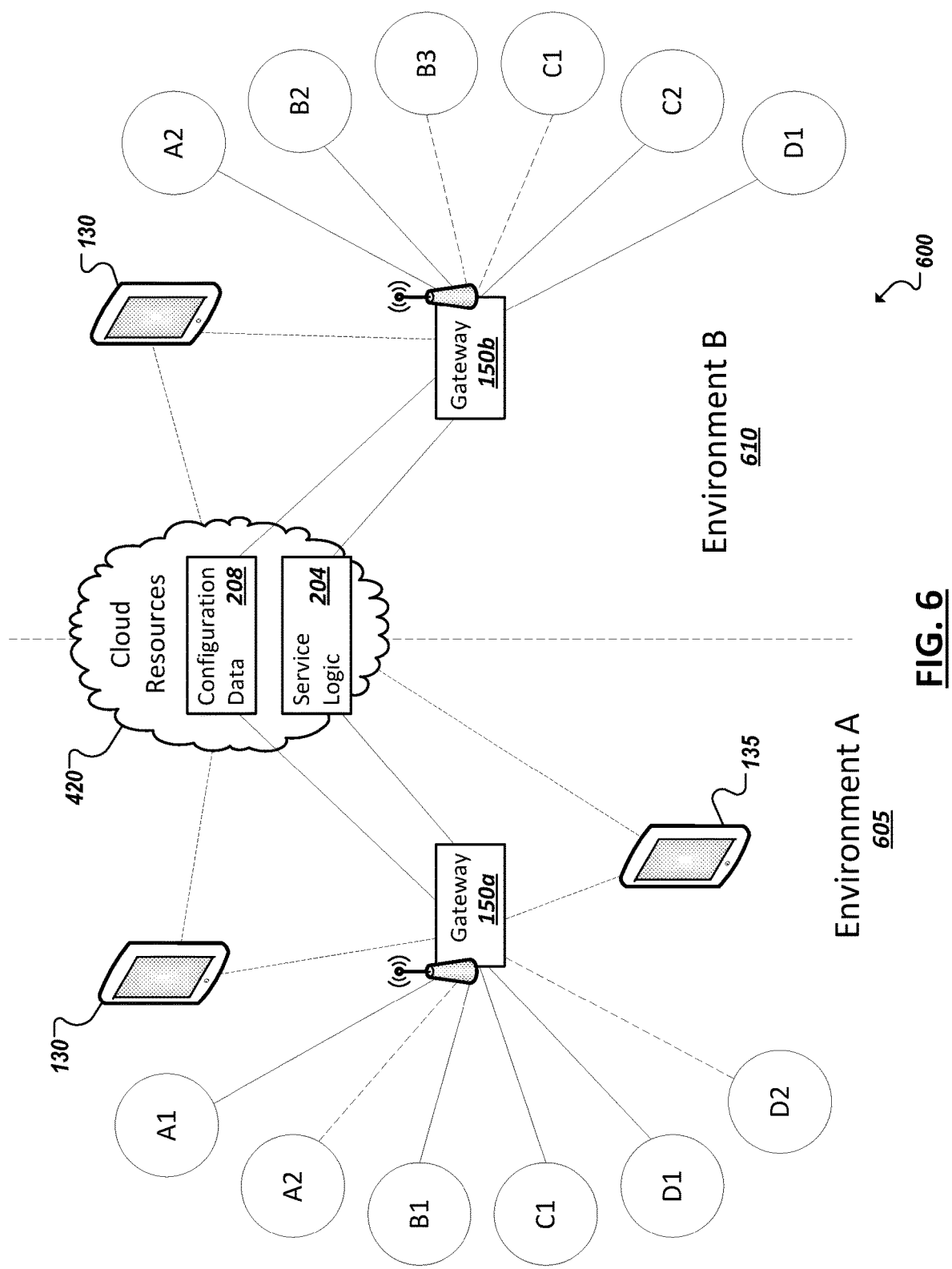
FIG. 6 is a simplified block diagram illustrating an example of managing application of configuration settings between two instances of a particular machine-to-machine system.

Turning to FIG. 6, as noted above, an application developed according to the principles of asset abstraction, as described herein, can allow a given IoT application to be deployed in a number of locations employing varied collections of IoT devices and assets. Further, configurations can be provided to determine characteristics of a particular deployment of the IoT application. In some cases, different configurations can be employed in different deployments of the same IoT applications, leading potentially, to different outcomes in each deployment (including in deployments that are otherwise identical (e.g., using the same combination of IoT devices in a comparable environment)). In other cases, the same configurations can be employed in distinct deployments that utilize different combinations of devices (e.g., different devices bound to at least some of the defined abstractions of the IoT application) to yield comparable outcomes, even when the devices used are not identical. As an example, a user can define preferred settings in a particular configuration for a particular IoT application and cause different deployments of the particular IoT application (in other locations) to also adopt the user's preferred settings when they are deployed. For instance, frequent travelers may prefer to create a home-like environment (e.g., in a hotel, office, or vacation rental remote from their home) by causing particular configuration data defined by the user (e.g., hosted on a cloud 420) to be applied to each environment in which deployable devices exist. Accordingly, the particular configuration data can be used to deploy multiple instances of an IoT application (with potentially different devices) all with the same settings.

For instance, as shown in the simplified block diagram 600 of FIG. 6, in a first environment 605, a first gateway 150a can be utilized to deploy a first instance of a particular IoT application. Service logic (e.g., 204) to implement the IoT application may be hosted on gateway 150a and/or remotely by an application server or other system(s) providing cloud resources (e.g., 420). In one example, a smartphone 130 (or other device) may enter the first environment 605 and communicate with a corresponding gateway 150a to indicate that a first set of configurations should be employed in a deployment of an IoT application in the first environment 605. For instance, the gateway 150a may deploy the IoT application in the first environment 605 by discovering a set of assets A1, A2, B1, C1, D1, D2, where assets A1 and A2 are instances of taxonomy A, asset B1 is an instance of taxonomy B, and so on. The IoT application, in this example, may have asset requirements corresponding to taxonomies A, B, C, D, and E. Asset binding can be performed, resulting in assets A1, B1, C1, D1 and E1 being selected and deployed for the instance of the IoT application deployment in Environment A 605. Additionally, a particular set of configurations (defined in configuration data 208) may be pushed to the selected assets (A1, B1, C1, D1, E1) for use in the deployment. In some examples, the use of this particular set of configurations may be based on a request of a user or even the identification (e.g., by the gateway) that a particular user device associated with a user is present in Environment A 405. Accordingly, the gateway can configure an IoT application's particular deployment based on the preferences of a user within the environment, a property owner (e.g., a manager or owner of the environment), according to government or corporate regulations, among other examples.

In another, remote environment, Environment B (610), an instance of the same IoT application may be deployed by another gateway 150b in the other environment 610. A different set of assets may be discovered in Environment B 610 than was used in Environment A 605, resulting in a different set of deployed assets (e.g., A2, B2, C2, D1, and E1) for the IoT application in Environment B 610. Some of the assets in Environment B may be instances of the same asset (e.g., the same device model) discovered in Environment A (e.g., A2, C1, D1). Some assets may not be strongly tied to location, such as assets on a mobile device (e.g., 130) that may be used in both the IoT application deployments in Environments A and B. Despite the deployments being different between the two environments (e.g., 605, 610), when viewed at the asset abstraction level, the deployments may be functional equivalents. Further, the settings utilized in each deployment can be applied equally within each environment 605, 610 by providing the same configurations (from configuration data 204) to each of the respective IoT application deployments. As an example, a sensitivity setting value defined in the configuration data for the taxonomy instance B can be applied equally to each of assets B1 and B2 (and, for that matter, B3, when deployed), allowing the system managers of the gateways to attempt to achieve equivalent systems utilizing different collections of assets. While, in practice, the resulting systems may not be functionally identical (as differences between the asset instances (e.g., B1 and B2) may manifest, even when configured with the same settings), implementations of the application in varied environments can be at least approximated with minimal effort of the user.

In some cases, the use of a particular set of configurations may be based on a particular user being present, controlling, or otherwise administering a particular deployment of an IoT application. Configuration data defining such a set of configurations may be hosted in a cloud-based or other storage system (e.g., 420) which may be accessed by multiple different gateways at the direction of potentially multiple different users. In some cases, a set of configurations can be private to a particular user or group of users. In other cases, configurations may be more widely shared and accessible. For instance, settings defined by a first user (e.g., of device 130) for a first instance of a given IoT application can be shared and applied at a second instance of the same IoT application at the request of another user (e.g., of device 135). For instance, an individual may want to share their preferred smart home/office settings with their friends. For instance, rather than "reinventing the wheel" to determine the ideal balance of settings, a user can simply adopt the settings of another user for application within their own environment (e.g., home automation settings, smart lighting settings, fitness system settings, smart agriculture settings, etc.) by accessing corresponding configuration data (e.g., 208) and requesting that this configuration data be employed in a deployment controlled by the other user. For example, a person may be inspired by visiting a friend's home (e.g., environment 610) and desire to apply similar settings to an IoT system within their home (e.g., environment 605), among other examples.

While some of the systems and solution described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Figure 7:
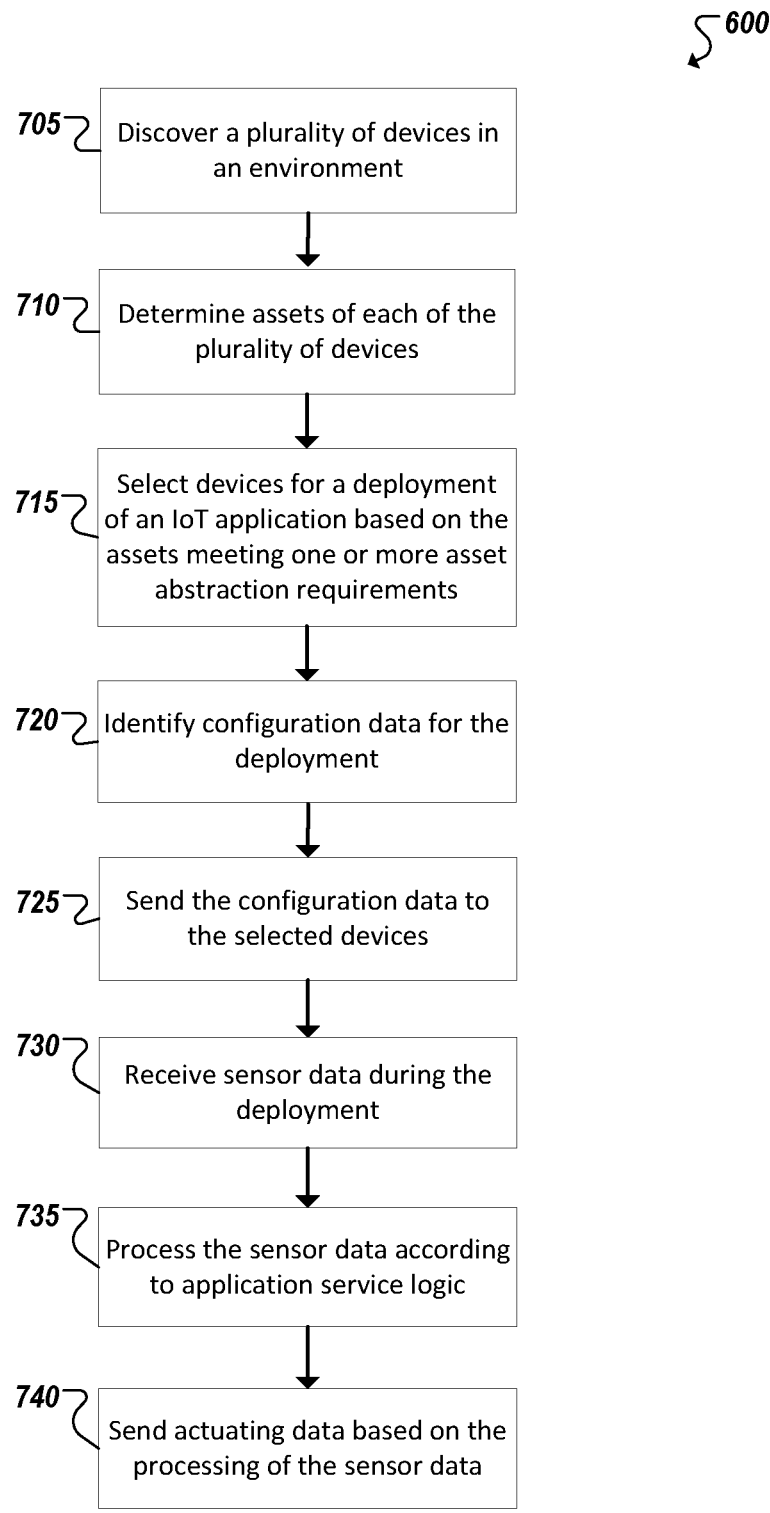
FIG. 7 is a flowchart illustrating an example technique for deploying an example machine-to-machine network utilizing asset abstraction.

FIG. 7 is a simplified flowchart 700 illustrating example technique for deploying an IoT application or other machine-to-machine system. For instance, a gateway may be utilized to discover 705 a plurality of devices within range of the gateway. The gateway may determine 710 assets present on the discovered devices and select 715 devices for a particular deployment of an IoT application based on the assets meeting one or more asset abstraction requirements defined for the IoT application. In some cases, the gateway may make these determinations (e.g., 710, 715) autonomously, while in other cases the gateway may consume services of a remote system in connection with making the one or more of determinations 710, 715. Configuration data may be identified 720 for the particular IoT application deployment. The configuration data may be hosted locally on the gateway and/or hosted by (and accessed by the gateway from) one or more remote data stores and systems. In some cases, the configuration data may correspond to or be selected by a user of the particular IoT application deployment. The identified configuration data may be sent 725 (in an automated manner (e.g., in direct response to the detection 705 and selection 715 of a device)) to each of the selected devices to affect how the assets of the devices operate within the deployment. Indeed, during the deployment, sensor assets may generate sensor data according to the configurations and this sensor data may be received 730 and processed 735 by the gateway according to service logic selected for the deployment. Portions of the service logic may be hosted (and executed) on the gateway and/or on a remote server system. Results of the processing may be used to generate actuating messages that are sent 740 by the gateway to one or more actuator assets of the deployed devices to cause activities to be performed corresponding to the actuators and based on the information collected in the deployment by the sensor assets.

Figure 8:
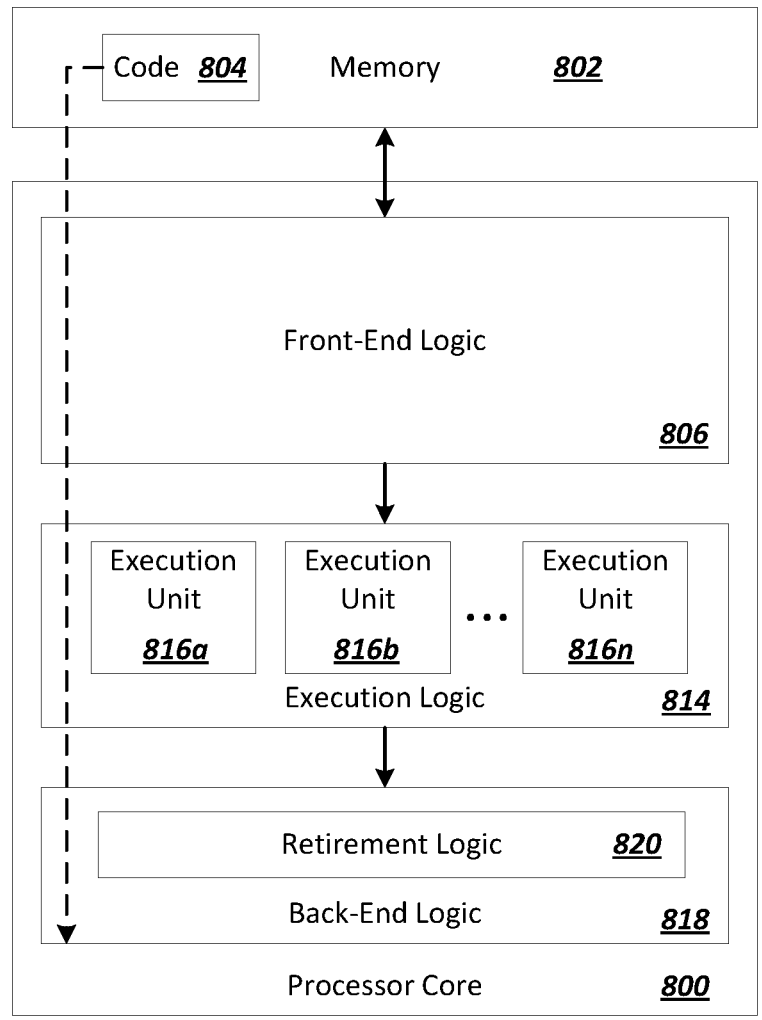
FIG. 8 is a block diagram of an exemplary processor in accordance with one embodiment.
Figure 9:
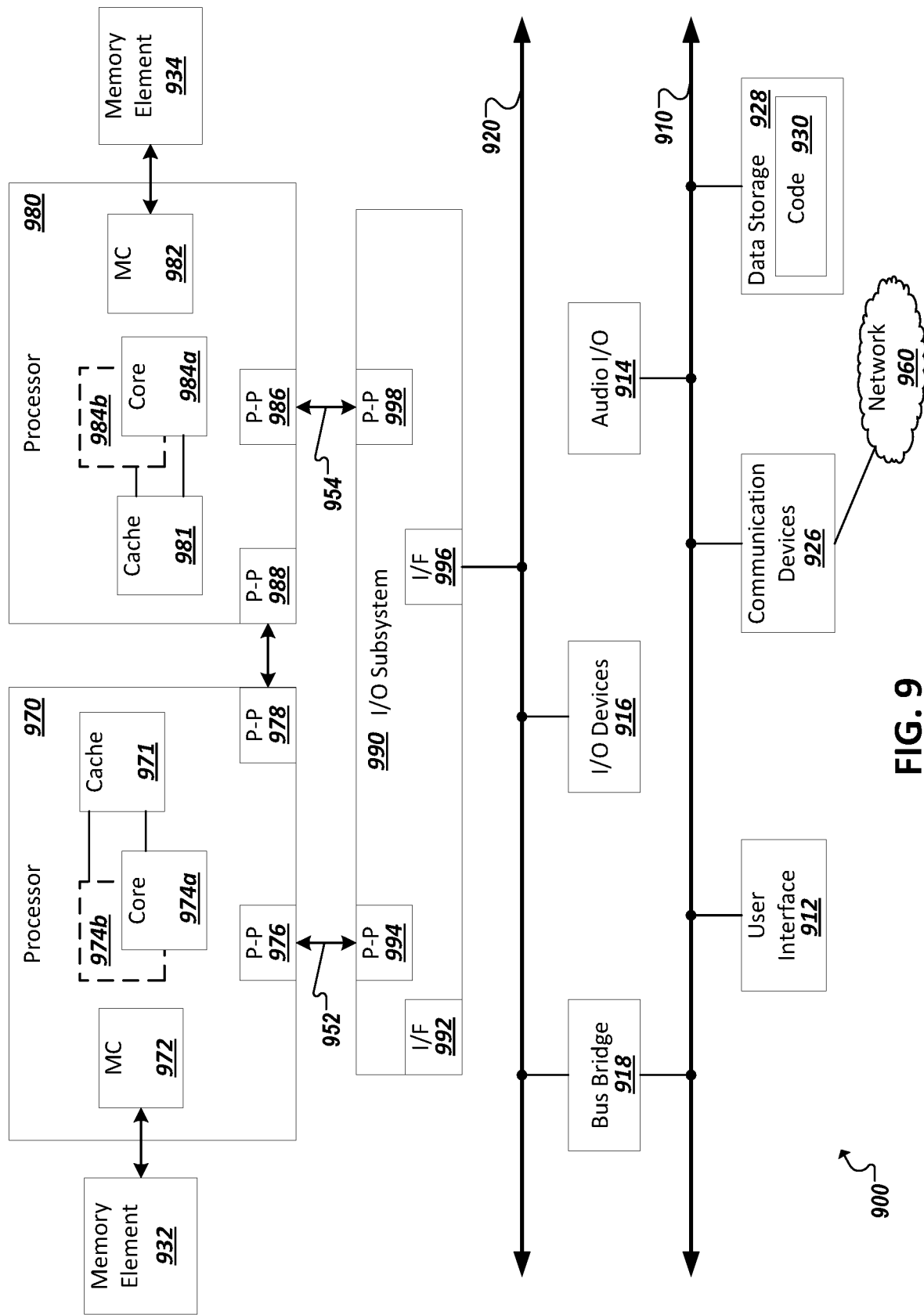
FIG. 9 is a block diagram of an exemplary computing system in accordance with one embodiment.

FIGS. 8-9 are block diagrams of exemplary computer architectures that may be used in accordance with embodiments disclosed herein. Other computer architecture designs known in the art for processors and computing systems may also be used. Generally, suitable computer architectures for embodiments disclosed herein can include, but are not limited to, configurations illustrated in FIGS. 8-9.

FIG. 8 is an example illustration of a processor according to an embodiment. Processor 800 is an example of a type of hardware device that can be used in connection with the implementations above. Processor 800 may be any type of processor, such as a microprocessor, an embedded processor, a digital signal processor (DSP), a network processor, a multi-core processor, a single core processor, or other device to execute code. Although only one processor 800 is illustrated in FIG. 8, a processing element may alternatively include more than one of processor 800 illustrated in FIG. 8. Processor 800 may be a single-threaded core or, for at least one embodiment, the processor 800 may be multi-threaded in that it may include more than one hardware thread context (or "logical processor") per core.

FIG. 8 also illustrates a memory 802 coupled to processor 800 in accordance with an embodiment. Memory 802 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 800 can execute any type of instructions associated with algorithms, processes, or operations detailed herein. Generally, processor 800 can transform an element or an article (e.g., data) from one state or thing to another state or thing.

Code 804, which may be one or more instructions to be executed by processor 800, may be stored in memory 802, or may be stored in software, hardware, firmware, or any suitable combination thereof, or in any other internal or external component, device, element, or object where appropriate and based on particular needs. In one example, processor 800 can follow a program sequence of instructions indicated by code 804. Each instruction enters a front-end logic 806 and is processed by one or more decoders 808. The decoder may generate, as its output, a micro operation such as a fixed width micro operation in a predefined format, or may generate other instructions, microinstructions, or control signals that reflect the original code instruction. Front-end logic 806 also includes register renaming logic 810 and scheduling logic 812, which generally allocate resources and queue the operation corresponding to the instruction for execution.

Processor 800 can also include execution logic 814 having a set of execution units 816a, 816b, 816n, etc. Some embodiments may include a number of execution units dedicated to specific functions or sets of functions. Other embodiments may include only one execution unit or one execution unit that can perform a particular function. Execution logic 814 performs the operations specified by code instructions.

After completion of execution of the operations specified by the code instructions, back-end logic 818 can retire the instructions of code 804. In one embodiment, processor 800 allows out of order execution but requires in order retirement of instructions. Retirement logic 820 may take a variety of known forms (e.g., re-order buffers or the like). In this manner, processor 800 is transformed during execution of code 804, at least in terms of the output generated by the decoder, hardware registers and tables utilized by register renaming logic 810, and any registers (not shown) modified by execution logic 814.

Although not shown in FIG. 8, a processing element may include other elements on a chip with processor 800. For example, a processing element may include memory control logic along with processor 800. The processing element may include I/O control logic and/or may include I/O control logic integrated with memory control logic. The processing element may also include one or more caches. In some embodiments, non-volatile memory (such as flash memory or fuses) may also be included on the chip with processor 800.

FIG. 9 illustrates a computing system 900 that is arranged in a point-to-point (PtP) configuration according to an embodiment. In particular, FIG. 9 shows a system where processors, memory, and input/output devices are interconnected by a number of point-to-point interfaces. Generally, one or more of the computing systems described herein may be configured in the same or similar manner as computing system 900.

Processors 970 and 980 may also each include integrated memory controller logic (MC) 972 and 982 to communicate with memory elements 932 and 934. In alternative embodiments, memory controller logic 972 and 982 may be discrete logic separate from processors 970 and 980. Memory elements 932 and/or 934 may store various data to be used by processors 970 and 980 in achieving operations and functionality outlined herein.

Processors 970 and 980 may be any type of processor, such as those discussed in connection with other figures. Processors 970 and 980 may exchange data via a point-to-point (PtP) interface 950 using point-to-point interface circuits 978 and 988, respectively. Processors 970 and 980 may each exchange data with a chipset 990 via individual point-to-point interfaces 952 and 954 using point-to-point interface circuits 976, 986, 994, and 998. Chipset 990 may also exchange data with a high-performance graphics circuit 938 via a high-performance graphics interface 939, using an interface circuit 992, which could be a PtP interface circuit.

In alternative embodiments, any or all of the PtP links illustrated in FIG. 9 could be implemented as a multi-drop bus rather than a PtP link.

Chipset 990 may be in communication with a bus 920 via an interface circuit 996. Bus 920 may have one or more devices that communicate over it, such as a bus bridge 918 and I/O devices 916. Via a bus 910, bus bridge 918 may be in communication with other devices such as a user interface 912 (such as a keyboard, mouse, touchscreen, or other input devices), communication devices 926 (such as modems, network interface devices, or other types of communication devices that may communicate through a computer network 960), audio I/O devices 914, and/or a data storage device 928. Data storage device 928 may store code 930, which may be executed by processors 970 and/or 980. In alternative embodiments, any portions of the bus architectures could be implemented with one or more PtP links.

The computer system depicted in FIG. 9 is a schematic illustration of an embodiment of a computing system that may be utilized to implement various embodiments discussed herein. It will be appreciated that various components of the system depicted in FIG. 9 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

In general, one aspect of the subject matter described in this specification can be embodied in methods and executed instructions that include or cause the actions of identifying a sample that includes software code, generating a control flow graph for each of a plurality of functions included in the sample, and identifying, in each of the functions, features corresponding to instances of a set of control flow fragment types. The identified features can be used to generate a feature set for the sample from the identified features These and other embodiments can each optionally include one or more of the following features. The features identified for each of the functions can be combined to generate a consolidated string for the sample and the feature set can be generated from the consolidated string. A string can be generated for each of the functions, each string describing the respective features identified for the function. Combining the features can include identifying a call in a particular one of the plurality of functions to another one of the plurality of functions and replacing a portion of the string of the particular function referencing the other function with contents of the string of the other function. Identifying the features can include abstracting each of the strings of the functions such that only features of the set of control flow fragment types are described in the strings. The set of control flow fragment types can include memory accesses by the function and function calls by the function. Identifying the features can include identifying instances of memory accesses by each of the functions and identifying instances of function calls by each of the functions. The feature set can identify each of the features identified for each of the functions. The feature set can be an n-graph.

Further, these and other embodiments can each optionally include one or more of the following features. The feature set can be provided for use in classifying the sample. For instance, classifying the sample can include clustering the sample with other samples based on corresponding features of the samples. Classifying the sample can further include determining a set of features relevant to a cluster of samples. Classifying the sample can also include determining whether to classify the sample as malware and/or determining whether the sample is likely one of one or more families of malware. Identifying the features can include abstracting each of the control flow graphs such that only features of the set of control flow fragment types are described in the control flow graphs. A plurality of samples can be received, including the sample. In some cases, the plurality of samples can be received from a plurality of sources. The feature set can identify a subset of features identified in the control flow graphs of the functions of the sample. The subset of features can correspond to memory accesses and function calls in the sample code.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. One or more embodiments may provide a method, a system, a machine readable storage medium, and an apparatus including a gateway including an antenna to connect to a set of devices over a wireless network and configuration management logic executable to identify a set of configurations corresponding to a particular application, and send configuration data to at least a portion of the set of devices to cause the set of configurations to be adopted in a particular deployment of the particular application that is to use the set of devices. The gateway can further include service management logic executable to discover the set of devices within range of the gateway, determine that one or more of the devices include assets corresponding to one or more asset abstractions defined for the particular application, where the configuration data is sent to at least a portion of the set of devices based on the assets corresponding to the asset abstractions, and the assets include at least one sensor asset and at least one actuator asset, receive sensor data generated by the at least one sensor asset during the particular deployment, process the sensor data according to service logic of the particular application to generate a result, and generate actuating data to be sent to the at least one actuator asset based on the result during the particular deployment.

In one example, the service logic is hosted on the gateway.

In one example, the service management logic is further to send a request to a remote server hosting the service logic, where the request is to include at least a portion of the sensor data, and receive a response to the request from the remote server, where the result is based on the response.

In one example, the gateway includes local data storage to host at least a portion of the configuration data.

In one example, the configuration management logic is further to: identify that first configuration data hosted on a data store remote from the gateway is to be used in deployment of particular application and access the first configuration data, where the configuration data sent to at least a portion of the set of devices includes the first configuration data.

In one example, the configuration management logic is to access second configuration data hosted local to the gateway and use the second configuration data in another, second deployment of the particular application.

In one example, the configuration data sent to at least a portion of the set of devices in the particular deployment includes both the first configuration data and the second configuration data.

In one example, the configuration data specifies settings to be applied by the at least one sensor asset in generating the sensor data during deployment of the particular application.

In one example, the configuration data further specifies settings to be applied by the at least one actuator asset in responding to actuating data provided by the gateway during the particular deployment of the particular application.

In one example, the set of devices includes a smart phone device including at least one sensor asset and at least one actuator asset.

In one example, the set of devices includes a plurality of devices including a plurality of different types of assets.

In one example, each of the plurality of different types of assets maps to one or more of a plurality of defined asset abstractions.

In one example, the one or more asset abstractions of the particular application include a subset of the plurality of defined asset abstractions.

In one example, the service management logic is further to monitor for devices entering or exiting the range of the gateway during the particular deployment.

In one example, the particular deployment corresponds to a particular geographic location and the gateway is positioned with the particular geographic location.

In one example, the service management logic is to automatically configure a new device detected as entering the range of the gateway and include the new device in the particular deployment without interrupting the particular deployment.

One or more embodiments may provide a method, a system, a machine readable storage medium, and an apparatus including a set of assets including at least one of a sensor asset and an actuator asset, a communication module to communicate wirelessly with a gateway device positioned within a particular geographical location, and logic executable to receive configuration data from the gateway device in response to the apparatus entering a wireless communication range of the gateway device, apply one or more configurations identified in the configuration data to at least a particular one of the set of assets during a deployment of a particular application including a machine-to-machine system to include the apparatus and at least one other device, and communicate with the gateway device during the deployment of the particular application.

In one example, the configuration data is received automatically without intervention of a human user in response to the apparatus entering the wireless communication range of the gateway device.

In one example, the configuration data originates from a source remote from the gateway device and the apparatus.

One or more embodiments may provide a system including one or more gateway devices corresponding to a particular location, where each of the one or more gateway devices includes service management logic executable by a processor of the gateway device to identify service logic corresponding to a particular application, discover a set of devices within the particular location based on the service logic, determine that one or more of the set of devices includes one or more assets corresponding to one or more asset abstractions defined for the particular application, where the one or more assets include at least one sensor asset and at least one actuator asset, receive sensor data generated by the at least one sensor asset, process the sensor data according to the service logic to generate a result, and generate actuating data to be sent to the at least one actuator asset based on the result. Each gateway device may additionally include configuration management logic executable by a processor of the gateway device to identify a set of configurations corresponding to the particular application and send configuration data to at least a portion of the set of devices, where the configuration data is sent to at least a portion of the set of devices based on the assets corresponding to the asset abstractions.

In one example, where the service logic is programmed according to a defined set of asset abstractions including the one or more asset abstractions.

In one example, the system further includes a data store remote from the one or more gateway devices, where the data store stores particular configuration data for access by a plurality of gateway devices including the one or more gateway devices, and the configuration data sent to at least a portion of the set of devices includes the particular configuration data.

In one example, the one or more gateways are a plurality of gateways devices.

In one example, the system further includes a remote server hosting the service logic and the result is based on processing of at least a portion of the sensor data by the remote server.

Thus, particular embodiments of the subject matter have been described.

Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

The invention claimed is:

1. An apparatus comprising:
a gateway, wherein the gateway comprises:
an antenna to connect to a set of devices over a wireless network;
configuration management logic executable to:
identify a set of configurations corresponding to a particular application, wherein the particular application defines a plurality of models and interactions between the plurality of models each of the plurality of models includes a respective abstract representation of a respective one of a plurality of device types and operational capabilities of the corresponding device type, and the application is cause a system comprising the plurality of device types to perform particular function;
send configuration data to at least a portion of the set of devices to cause the set of configurations to be adopted in a particular deployment of the particular application that is to use the set of devices; and
service management logic executable to:
discover the set of devices within range of the gateway;
determine that one or more of the set of devices comprise assets correspond to the plurality of models defined for the particular application, wherein the configuration data is sent to at least a portion of the set of devices based on the assets the one or more devices corresponding to the plurality of models, and the assets comprise at least one sensor asset and at least one actuator asset;
receive sensor data generated by the at least one sensor asset during the particular deployment;
process the sensor data according to service logic of the particular application to generate a result; and
generate actuating data to be sent to the at least one actuator asset based on the result during the particular deployment and to perform at least a portion of the particular function.

* * * * *